(12) United States Patent
Kroeker

(10) Patent No.: US 6,868,380 B2
(45) Date of Patent: Mar. 15, 2005

(54) SPEECH RECOGNITION SYSTEM AND METHOD FOR GENERATING PHONOTIC ESTIMATES

(75) Inventor: John Kroeker, Hamilton, MA (US)

(73) Assignee: Eliza Corporation, Beverly, MA (US)

( * ) Notice: Subject to any disclaimer, the term of this patent is extended or adjusted under 35 U.S.C. 154(b) by 551 days.

(21) Appl. No.: 09/815,768

(22) Filed: Mar. 23, 2001

(65) Prior Publication Data

US 2001/0051871 A1 Dec. 13, 2001

Related U.S. Application Data

(60) Provisional application No. 60/192,090, filed on Mar. 24, 2000, provisional application No. 60/192,091, filed on Mar. 24, 2000, provisional application No. 60/192,076, filed on Mar. 24, 2000, and provisional application No. 60/191,915, filed on Mar. 24, 2000.

(51) Int. Cl.[7] .............................................. G10L 15/10
(52) U.S. Cl. ....................... 704/240; 704/236; 704/243; 704/258
(58) Field of Search ................................ 704/240, 236, 704/243, 258, 211, 214, 216–218, 231, 233, 237, 251, 252, 254, 263, 267–269

(56) References Cited

U.S. PATENT DOCUMENTS

| | | | |
|---|---|---|---|
| 5,027,408 A | 6/1991 | Kroeker et al. | |
| 5,083,268 A | 1/1992 | Hemphill et al. | ............. 395/12 |
| 5,168,524 A | * 12/1992 | Kroeker et al. | ............. 704/254 |
| 5,369,726 A | 11/1994 | Kroeker et al. | ............. 395/2.45 |
| 5,457,768 A | 10/1995 | Tsuboi et al. | ................. 395/2.4 |
| 5,647,002 A | 7/1997 | Brunson | ................... 380/49 |
| 5,659,542 A | 8/1997 | Bell et al. | ................... 370/496 |
| 5,687,212 A | 11/1997 | Kinser, Jr. et al. | ............ 379/10 |
| 5,687,384 A | 11/1997 | Nagase | ........................ 395/759 |
| 5,729,656 A | 3/1998 | Nahamoo et al. | ........... 395/2.63 |
| 5,748,841 A | 5/1998 | Morin et al. | ................. 395/2.66 |

(List continued on next page.)

OTHER PUBLICATIONS

L.R. Rabiner and R.W. Schafer, "Digital Processing of Speech Signals," pp. 141–158, Prentice Hall, 1978.*
K. Weber, IDIAP Research Report, Multiple Timescale Feature Combination Towards Robust Speech Recognition, Sep. 2000.

(List continued on next page.)

*Primary Examiner*—Susan McFadden
(74) *Attorney, Agent, or Firm*—McDermott Will & Emery LLP

(57) ABSTRACT

A speech recognition system for transforming an acoustic signal into a stream of phonetic estimates includes a frequency analyzer for generating a short-time frequency representation of the acoustic signal. A novelty processor separates background components of the representation from region of interest components of the representation. The output of the novelty processor includes the region of interest components of the representation according to the novelty parameters. An attention processor produces a gating signal as a function of the novelty output according to attention parameters. A coincidence processor produces information regarding co-occurrences between samples of the novelty output over time and frequency. The coincidence processor selectively gates the coincidence output as a function of the gating signal according to one or more coincidence parameters. A vector pattern recognizer and a probability processor receives the gated coincidence output and produces a phonetic estimate stream representative of acoustic signal.

8 Claims, 29 Drawing Sheets

U.S. PATENT DOCUMENTS

| | | | |
|---|---|---|---|
| 5,799,276 A | 8/1998 | Komissarchik et al. | 704/251 |
| 5,822,728 A | 10/1998 | Applebaum et al. | 704/254 |
| 5,822,729 A | 10/1998 | Glass | 704/255 |
| 5,825,977 A | 10/1998 | Morin et al. | 395/2.64 |
| 5,835,890 A | 11/1998 | Matsui et al. | 704/255 |
| 5,864,614 A | 1/1999 | Farris et al. | 379/207 |
| 6,052,682 A | 4/2000 | Miller et al. | 707/3 |
| 6,134,548 A | 10/2000 | Gottsman et al. | |
| 6,154,720 A | 11/2000 | Onishi et al. | |
| 6,173,261 B1 | 1/2001 | Arai et al. | |
| 6,173,279 B1 | 1/2001 | Levin et al. | |
| 6,233,561 B1 | 5/2001 | Junqua et al. | |
| 6,311,153 B1 * | 10/2001 | Nakatoh et al. | 704/216 |
| 2003/0055639 A1 * | 3/2003 | Rees | 704/233 |

OTHER PUBLICATIONS

Sharma, et al., Feature Extraction Using Non–Linear Transformation for Robust Speech Recognition on the Aurora Database, p. 1117–1120.

Wu, et al., Incorporating Information from Syllable–Length Time Scales into Automatic Speech Recognition.

Institute of Phonetic Sciences, Flexible, Robust, and Efficient Human Speech Recognition, 1997, 1–10.

Bourlard, et al., Speech Communication 18 (1996), Towards Increasing Speech Recognition Error Rates, 205–231.

Kingsbury, Dissertation re: Perceptually Inspired Signal–Processing Strategies for Robust Speech Recognition in Reverberant Environments, 1998.

Sharma, Dissertation re: Multi–Stream Approach to Robust Speech Recognition, 1999.

Makhoul, J. and R. Schwartz, State of the art continuous speech recognition, Proc. Natl. Acad. Sci. USA, vol. 92, pp. 9956–9963, 1995.

Houlding, David, Voice XML and the Voice–Driven Internet, Dr. Dobb's Journal, Apr. 2001.

S. Okawa, et al., Dept. of Information and Computer Science, Waseda University, Estimation of Statistical Phoneme Center Considering Phonemic Environments, pp 1069–1072.

L. Atlas, et al., Dept. of Electrical Engineering, University of Washington, Quadratic Detectors for General Nonlinear Analysis of Speech, pp II–9–II–12.

* cited by examiner

FRICATIVES

Novelty Processing

| Channel | Center Start | Center Length | Center Width | Alpha | Surround Start | Surround Length | Surround Width |
|---|---|---|---|---|---|---|---|
| 0 | 10 | 6 | 1 | 0.6 | 0 | all | 1 |
| 1 | 4 | 3 | 8 | 0.7 | 6 | 8 | 3 |
| 2 | 0 | 4 | 2 | 0.7 | 1 | 8 | 10 |
| 3 | 1 | 2 | 2 | 1.0 | 0 | all | 1 |
| 4 | 10 | 4 | 4 | 0.9 | 0 | all | 1 |
| 5 | 0 | 1 | 10 | 1.1 | 4 | 2 | 14 |

FIG. 4

Coincidence Processing. The output size is 576

| Function | Attention Trigger | Delta | Start | Stop | Width | Novelty Channel |
|---|---|---|---|---|---|---|
| eCrossColumn | ePlus | -1 | 1 | 12 | 7 | 0 |
| eCrossColumn | eMinus | 1 | 0 | 14 | 13 | 2 |
| eCrossColumn | eDeltaMinus | -6 | 6 | 24 | 6 | 2 |
| eCrossColumn | eDeltaPlus | 1 | 12 | 23 | 3 | 2 |
| eCrossColumn | eDeltaMinus | 0 | 3 | 24 | 2 | 3 |
| eCrossColumn | eDeltaPlusM2 | -5 | 5 | 24 | 1 | 3 |
| eCrossColumn | eMinus | -5 | 22 | 24 | 8 | 4 |
| eCrossColumn | ePlus | 0 | 8 | 13 | 1 | 4 |
| eCrossColumn | eDeltaPlusP2 | -7 | 7 | 24 | 6 | 5 |
| eCrossColumn | eDeltaPlus | 3 | 0 | 21 | 16 | 5 |
| eCrossColumn | ePlus | -5 | 8 | 24 | 16 | 5 |
| selfAddLocalFreq | eDeltaMinus |  | 7 | 24 | 6 | 5 |
| selfAddLocalFreq |  |  | 14 | 24 | 10 | 5 |
| selfAddLocalFreq | eMinus |  | 1 | 24 | 5 | 5 |
| selfAddLocalFreq | eDeltaPlus |  | 1 | 24 | 8 | 2 |
| selfAddLocalFreq | eDeltaMinus |  | 0 | 22 | 13 | 1 |
| selfAddLocalFreq | eMinus |  | 0 | 7 | 6 | 1 |
| selfAddLocalFreq | eDeltaMinus |  | 3 | 24 | 11 | 0 |
| crossAddLocalFreq | eDeltaPlus | 2 | 0 | 22 | 9 | 1 |
| crossAddLocalFreq | eDeltaMinus | 3 | 0 | 21 | 15 | 1 |
| crossAddLocalFreq | eDeltaPlusP2 | 2 | 0 | 22 | 6 | 2 |
| crossAddLocalFreq |  | 1 | 13 | 23 | 11 | 2 |
| crossAddLocalFreq |  | -3 | 3 | 24 | 5 | 3 |
| crossAddLocalFreq |  | -1 | 1 | 24 | 3 | 3 |
| crossAddLocalFreq | ePlus | -4 | 4 | 24 | 12 | 5 |
| crossAddLocalFreq | ePlus | 3 | 0 | 21 | 11 | 5 |
| crossAddLocalFreq | eMinus | -2 | 2 | 24 | 11 | 5 |

FIG. 5

VOWELS

Novelty processing.

| Channel | Center Start | Center Length | Center Width | Alpha | Surround Start | Surround Length | Surround Width |
|---|---|---|---|---|---|---|---|
| 0 | 6 | 4 | 4 | 0.6 | 0 | 8 | 4 |
| 1 | 0 | 2 | 1 | 1.0 | 0 | all | 1 |
| 2 | 4 | 6 | 6 | 0.9 | 0 | all | 1 |
| 3 | 8 | 6 | 3 | 0.8 | 8 | 16 | 20 |
| 4 | 0 | 3 | 6 | 1.2 | 2 | 4 | 14 |
| 5 | 4 | 1 | 1 | 0.9 | 2 | 4 | 12 |

FIG. 6

Coincidence Processing. The output size is 696.

| Function | Attention Trigger | Delta | Start | Stop | Width | Novelty Channel |
|---|---|---|---|---|---|---|
| EcrossColumn | ePlus | -7 | 7 | 22 | 9 | 1 |
| EcrossColumn | eDeltaPlusM2 | -2 | 2 | 24 | 5 | 1 |
| ECrossColumn | ePlus | 2 | 0 | 21 | 3 | 1 |
| ECrossColumn | eMinus | -7 | 17 | 21 | 4 | 2 |
| ECrossColumn | eDeltaMinus | -4 | 4 | 24 | 13 | 2 |
| ECrossColumn | eDeltaPlus | -7 | 7 | 24 | 6 | 3 |
| ECrossColumn | | -7 | 7 | 12 | 6 | 3 |
| ECrossColumn | eMinus | -6 | 6 | 24 | 4 | 3 |
| ECrossColumn | eDeltaMinus | -2 | 2 | 24 | 10 | 4 |
| SelfAddLocalFreq | eDeltaPlusP2 | | 5 | 23 | 16 | 4 |
| SelfAddLocalFreq | ePlus | | 2 | 24 | 3 | 5 |
| SelfAddLocalFreq | eDeltaMinus | | 6 | 24 | 16 | 5 |
| SelfAddLocalFreq | eDeltaMinus | | 0 | 21 | 16 | 0 |
| SelfAddLocalFreq | | | 3 | 24 | 6 | 1 |
| SelfAddLocalFreq | ePlus | | 0 | 24 | 9 | 1 |
| CrossAddLocalFreq | | -4 | 4 | 24 | 5 | 1 |
| CrossAddLocalFreq | eDeltaPlus | -4 | 4 | 24 | 7 | 1 |
| CrossAddLocalFreq | eDeltaPlus | -3 | 3 | 23 | 5 | 2 |
| CrossAddLocalFreq | ePlus | 2 | 0 | 22 | 7 | 2 |
| CrossAddLocalFreq | ePlus | -2 | 2 | 24 | 5 | 3 |
| CrossAddLocalFreq | eMinus | -3 | 3 | 24 | 13 | 3 |
| CrossAddLocalFreq | eDeltaPlusP2 | 1 | 0 | 23 | 8 | 3 |
| CrossAddLocalFreq | eMinus | 1 | 0 | 23 | 5 | 4 |
| CrossAddLocalFreq | eDeltaPlus | -2 | 2 | 24 | 6 | 4 |
| CrossAddLocalFreq | ePlus | -2 | 2 | 24 | 4 | 5 |
| CrossAddLocalFreq | eMinus | -3 | 3 | 24 | 9 | 5 |

FIG. 7

NONFRICATIVES

Novelty Processing.

| Channel | Center Start | Center Length | Center Width | Alpha | Surround Start | Surround Length | Surround Width |
|---|---|---|---|---|---|---|---|
| 0 | 4 | 4 | 1 | 1.0 | 3 | 2 | 3 |
| 1 | 4 | 4 | 8 | 0.6 | 0 | All | 1 |
| 2 | 0 | 2 | 1 | 1.1 | 0 | 3 | 10 |
| 3 | 6 | 6 | 4 | 0.7 | 0 | All | 1 |
| 4 | 1 | 2 | 2 | 0.6 | 0 | All | 1 |
| 5 | 1 | 4 | 6 | 1.2 | 10 | 20 | 8 |

FIG. 8

Coincidence Processing. The output size is 697.

| Function | Attention Trigger | Delta | Start | Stop | Width | Novelty Channel |
|---|---|---|---|---|---|---|
| eCrossColumn | eDeltaPlus | -7 | 7 | 16 | 10 | 0 |
| eCrossColumn | eMinus | 0 | 0 | 23 | 10 | 0 |
| eCrossColumn |  | -2 | 2 | 24 | 4 | 0 |
| eCrossColumn | ePlus | -7 | 7 | 17 | 6 | 1 |
| eCrossColumn | eDeltaPlus | -1 | 14 | 24 | 10 | 1 |
| eCrossColumn | eDeltaPlus | 1 | 0 | 23 | 2 | 2 |
| eCrossColumn | eDeltaMinus | 0 | 0 | 24 | 4 | 2 |
| eCrossColumn | eDeltaPlus | -1 | 1 | 24 | 13 | 2 |
| eCrossColumn | ePlus | 2 | 0 | 18 | 10 | 4 |
| eCrossColumn | eMinus | -5 | 10 | 24 | 5 | 5 |
| selfAddLocalFreq | ePlus |  | 4 | 18 | 17 | 0 |
| selfAddLocalFreq | eDeltaMinus |  | 0 | 24 | 5 | 0 |
| selfAddLocalFreq | eDeltaPlusM2 |  | 5 | 23 | 6 | 1 |
| selfAddLocalFreq |  |  | 1 | 24 | 4 | 2 |
| crossAddLocalFreq | eMinus | 3 | 0 | 21 | 5 | 0 |
| crossAddLocalFreq | ePlus | -2 | 2 | 24 | 12 | 0 |
| crossAddLocalFreq |  | -4 | 4 | 24 | 6 | 2 |
| crossAddLocalFreq |  | 1 | 0 | 23 | 5 | 2 |
| crossAddLocalFreq |  | -2 | 2 | 24 | 5 | 3 |
| crossAddLocalFreq | eDeltaPlus | 1 | 0 | 23 | 6 | 4 |
| crossAddLocalFreq |  | -4 | 4 | 24 | 9 | 4 |
| crossAddLocalFreq |  | -7 | 7 | 24 | 8 | 4 |
| crossAddLocalFreq | eDeltaPlus | -2 | 2 | 24 | 3 | 4 |
| crossAddLocalFreq | eDeltaPlusP2 | -3 | 3 | 24 | 10 | 4 |
| crossAddLocalFreq |  | -6 | 6 | 24 | 13 | 5 |
| crossAddLocalFreq | eDeltaPlus | 2 | 9 | 22 | 13 | 5 |

FIG. 9

```
!
! Default signal flow is from one line to the next.
! The general syntax is:
!      input1:, input2: ---> processName ---> output: with/from/to parameter-list
!
            putinmaxflo --->
            ---> mu_lawRT ---> mu:
mu:         ---> procrustes ---> spf:      with   192 192
mu:         ---> echocancel ---> input:    with   cancel 1
input:      ---> chunkify   --->  with     128 32
            ---> remove_mean ---> rem:
            ---> mv_multiply ---> dft:     with   Four4_57.tab
            ---> cvpower   ---> cvp:
cvp:        ---> procrustes --->  with     1 54
            ---> record_stats ---> eng:    with   sum no_normalize
cvp:        ---> hanning    ---> han:
            ---> procrustes --->  with     1 54
            ---> compress  ---> c: with  normalize 1 1 1 1 1 1 1 1 1 1 1 1 1 1 1 1 1 1 1 1 1
1 1 1 2 2 2 2 2 2 2 2 2 2 2 2 2 2 -1
eng: ,c:    ---> concatenate --->
            ---> log2      ---> log40:    with   1.0 log40:      ---> noveltyRT -->           with    vowels
            ---> normalize --->     with        no mu1vowels.log40 si1vowels.log40
,eng:       ---> zeroOnLow --->          with 0.0
            ---> extract ---> ev:         with   3 24 12
ev:         ---> eTrigger ---> tv:        with   6 24 41
ev:, tv:    ---> coincidenceRT --->       with   6 24 41 vowels
            ---> normalize ---> v:        with    no muvowels.p4 sivowels.p4 log40:      ---> noveltyRT -->           with    fricatives
            ---> normalize --->     with        no mu1fricatives.log40 si1fricatives.log40
,eng:       ---> zeroOnLow --->          with 0.0
            ---> extract ---> ef:         with   3 24 12
ef:         ---> eTrigger ---> tf:        with   6 24 41
ef:, tf:    ---> coincidenceRT --->       with   6 24 41 fricatives
            ---> normalize ---> f:        with    no mufricatives.p4 sifricatives.p4 log40:      ---> noveltyRT -->           with    nonfricatives
            ---> normalize --->     with   no mu1nonfricatives.log40 si1nonfricatives.log40
,eng:       ---> zeroOnLow --->          with 0.0
            ---> extract ---> en:         with   3 24 12
en:         ---> eTrigger ---> tn:        with   6 24 41
en:, tn:    ---> coincidenceRT --->       with   6 24 41 nonfricatives
            ---> normalize ---> nf:       with    no munonfricatives.p4 sinonfricatives.p4
```

FIG. 11A

```
v:, f:      ---> concatenate --->
, nf:       ---> concatenate --->
            ---> mean_square_norm ---> ms:    with    yes yes
ms:         ---> mv_multiply --->              with    k.GA
            ---> map --->                       with    npllr.GA
            ---> nBest --->best:               with    7 eng:        ---> extract --->                   with    3 24 23
            ---> record_stats ---> eLong:  with    sum normalize eLong:      ---> log2 --->                      with    1.0
,best:      ---> scale ---> ebest:              with    long 1000.0 200.0
spf:        ---> delay -->                      with    11
            ---> extract --->                   with    3 1 0
            ---> scale ---> sps:                with    long
sps:,ebest: ---> concatenate --->
            ---> putoutAS
                stop
```

FIG. 11B

List of Processes

| | |
|---|---|
| chunkify | - aggregates the sound data stream into overlapping segments |
| coincidenceRT | - see main text |
| compress | - aggregates each data vector into the given bins by averaging over bin |
| concatenate | - concatenates each pair of incoming vectors into one output vector |
| cvpower | - computes power spectrum from complex DFT spectrum |
| delay | - delays a data stream |
| eTrigger | - see main text |
| echocancel | - performs echocancelling using voice in and voice out streams |
| extract | - extracts a time window of specified width and decimation |
| hanning | - standard hanning filter |
| log2 | - log base2 |
| map | - applies a nonlinear, pointwise transform as specified by control file |
| mean_square_norm | - normalizes each vector by mean and standard deviation |
| mu_lawRT | - inverse mu-law |
| mv_multiply | - matrix-vector multiply |
| nBest | - zeros out all but the N highest elements of a vector |
| normalize | - subtracts constant mean vector, and divides by a constant scale vector |
| noveltyRT | - see main text |
| putinmaxflo | - provides input data stream from system |
| putoutAS | - accepts output phonetic stream to pass on to rest of system |
| record_stats | - computes mean and sigma for each vector |
| remove_mean | - subtracts the vector mean from each vector |
| procrustes | - selects a contiguous central portion of a vector |
| zeroOnLow | - zeros a vector according to empirical low energy condition |

Parameter Files

| | |
|---|---|
| Four4_57.tab | - Fourier coefficient matrix |
| k.GA | - matrix of phonetic vector-coefficients |
| mu1fricatives.log40 | - constant mean vector |
| mu1nonfricatives.log40 | - constant mean vector |
| mu1vowels.log40 | - constant mean vector |
| mufricatives.p4 | - constant mean vector |
| munonfricatives.p4 | - constant mean vector |
| muvowels.p4 | - constant mean vector |
| npllr.GA | - specifies nonlinear transform to create log-likelihood ratio output |
| si1fricatives.log40 | - constant scale vector |
| si1nonfricatives.log40 | - constant scale vector |
| si1vowels.log40 | - constant scale vector |
| sifricatives.p4 | - constant scale vector |
| sinonfricatives.p4 | - constant scale vector |
| sivowels.p4 | - constant scale vector |

FIG. 12

The ScaleMean object as referenced by normalizeRT.

```
#include "StdAfx.h"
#include <stdlib.h>
#include <stdio.h>
#include <assert.h>
include <math.h> define MAX_MEM 100 class ScaleMean
{
        Zbuffer *buf0;
        int start;
        int length;
        int width;
        int numberInBuf0;
        float* fInTime[ MAX_MEM ];

public:
        ScaleMean();
        float get( int i );
        void init( Zipper* aZipper, int aStart, int aLength, int aWidth);
        void update( Zipper* z1 );
        float sides( Zipper* z1, int i );
};

ScaleMean::ScaleMean()
{
        buf0 = NULL;
} void ScaleMean::init( Zipper* aZipper, int aStart, int aLength, int aWidth)
{
        start = aStart;
        length = aLength;
        width = aWidth;
        numberInBuf0 = 0;
        if ( buf0 == NULL )
                buf0 = new Zbuffer ( "buf0", aZipper->getType(), aZipper->getSize(),
start+length );
        else
                buf0->zero();
}
```

FIG. 13A

```
float ScaleMean::sides( Zipper* z1, int i )
{
        float sidesSum = (float) 0.0;
        float sidesMean;
        float* pf = (float*) z1->getData();

// Energy has no sides
        if ( i == 0 )
                return pf[0];

int n = 0;
        int size = (int) z1->getSize();
        // Add in sides where possible.
        int f = max( 1, i - width );
        int fEnd = min( size-1, i + width );
        while ( f <= fEnd ) {
                sidesSum += pf[f++];
                n++;
        } sidesMean = (float) quo( sidesSum, ( float ) n );
        return sidesMean;
} void ScaleMean::update( Zipper* z1 )
{
        buf0->update();

Zipper* z0 = buf0->get( buf0->getLength()-1 );
        float *pf = (float*) z0->getData();
        for ( long i = 0; i < (long) z1->getSize(); i++ ) {
                pf[i] = sides( z1, i );
        }
        if (numberInBuf0 < (int) buf0->getLength()) numberInBuf0++;
        int len = buf0->getLength();
        for (int j = 0; j < len; j++ )
        {       // Find the time in the past.
                Zipper *pz0 = buf0->get(len - 1 - j );
                fInTime[ j ] = ( float* ) pz0->getData();
        }
}
```

FIG. 13B

```
float ScaleMean::get( int i )
{
        float scaleSum = (float) 0.0;
        float scaleMean;

// Just average over the ones we actually have.
        float n = 0.0;
        for ( int j = start; j < numberInBuf0; j++ ) {
                float* fIn = fInTime[j];
                scaleSum += fIn[i];
                n++;
                }
        scaleMean = (float) quo( scaleSum, n );
        return scaleMean;
}
```

FIG. 13C

The NoveltyRT process. See Attachment 2 for the definition of the ScaleMean object.

Usage -
    data:,speaking: ---> NoveltyRT ---> with whichLabelset

```
*/
#include "StdAfx.h"
#include <stdlib.h>
#include <stdio.h>
#include <assert.h>
include <math.h> include "speedObject.h"
include "scalemean.h"

define MAX_SCALES 10 class NoveltyRT : public SpeedProcess
{
public:
        NoveltyRT();
        ~NoveltyRT();

int begin ();
        int beginFile(Zipper* z1, Zipper* z2 );
        Zipper* processZipper( Zipper* z1, Zipper* z2 );
        Zipper* finalFileZipper ();

void accumMeanAllTime();
        float getScaleMeanAllTime( int i );

void universal( int size, ScaleMean* center, ScaleMean* surround, double alpha );

private:
        Zbuffer *buf0;

int numberOfScales;
        int outSize;
        int whichFlavor;
        BOOL bSpeaking;

ScaleMean* cScales[ MAX_SCALES ];
        ScaleMean* sScales[ MAX_SCALES ];
        double alpha[ MAX_SCALES ];

Zbuffer *allTimeSum;
```

FIG. 14A

```
    Zipper* pZallTimeSum;
        float allTimeCount;

int iout;
        Zipper* theZout;
        void put( double x ) { theZout->put( iout++, x ); };
};

NoveltyRT::NoveltyRT() : SpeedProcess( "NoveltyRT" )
{
        allTimeSum = NULL;
        buf0 = NULL;
}

NoveltyRT::~NoveltyRT()
{
        delete allTimeSum;
}

/* NoveltyRT - called from initNet() in netnode.cpp
 * whenever a node is created for this process.
 */
SpeedObject* noveltyRT()
{
        return (new NoveltyRT);
} int NoveltyRT::begin ()
{
        whichFlavor = (int) parameters->askWords( "fricatives nonfricatives vowels" );
        allTimeSum = NULL;
        buf0 = NULL;
        for ( int i=0; i < MAX_SCALES; i++ ) {
                cScales[i] = NULL;
                sScales[i] = NULL;
        }
        return TRUE;
}

Zipper* NoveltyRT::finalFileZipper ()
{
        cout << "Spectrum for Transaction:" << endl;
        if ( allTimeCount > 0 )
                for ( int i = 0; i < pZallTimeSum->getSize(); i++ )
                        cout << pZallTimeSum->get(i)/allTimeCount << " ";
```

FIG. 14B

```
cout << endl;

dataState = BUF_EOT;
        return NULL;
} int NoveltyRT::beginFile(Zipper* z1, Zipper* z2)
{
        assert( z1->getType() == ELIZA_FLOAT );
        for ( int i=0; i < MAX_SCALES; i++ ) {
                delete cScales[i];
                delete sScales[i];
                cScales[i] = NULL;
                sScales[i] = NULL;
        }

// FRICATIVES
        if ( whichFlavor == 0 ) {
                numberOfScales = 6;
                cScales[0] = new ScaleMean();
                cScales[0]->init( z1, 10, 6, 1 );
                sScales[0] = NULL;
                alpha[0] = 0.6;

cScales[1] = new ScaleMean();
                cScales[1]->init( z1, 4, 3, 8 );
                sScales[1] = new ScaleMean();
                sScales[1]->init( z1, 6, 8, 3 );
                alpha[1] = 0.7;

cScales[2] = new ScaleMean();
                cScales[2]->init( z1, 0, 4, 2 );
                sScales[2] = new ScaleMean();
                sScales[2]->init( z1, 1, 8, 10 );
                alpha[2] = 0.7;

cScales[3] = new ScaleMean();
                cScales[3]->init( z1, 1, 2, 2 );
                sScales[3] = NULL;
                alpha[3] = 1.0;

cScales[4] = new ScaleMean();
                cScales[4]->init( z1, 10, 4, 4 );
                sScales[4] = NULL;
                alpha[4] = 0.9;
```

FIG. 14C

```
        cScales[5] = new ScaleMean();
        cScales[5]->init( z1, 0, 1, 10 );
        sScales[5] = new ScaleMean();
        sScales[5]->init( z1, 4, 2, 14 );
        alpha[5] = 1.1;
}

// VOWELS
else if ( whichFlavor == 2 ) {
        numberOfScales = 6;

cScales[0] = new ScaleMean();
        cScales[0]->init( z1, 6, 4, 4);
        sScales[0] = new ScaleMean();
        sScales[0]->init( z1, 0, 8, 4);
        alpha[0] = 0.6;

cScales[1] = new ScaleMean();
        cScales[1]->init( z1, 0, 2, 1 );
        sScales[1] =NULL;
        alpha[1] = 1.0;

cScales[2] = new ScaleMean();
        cScales[2]->init( z1, 4, 6, 6 );
        sScales[2] = NULL;
        alpha[2] = 0.9;

cScales[3] = new ScaleMean();
        cScales[3]->init( z1, 8, 6, 3 );
        sScales[3] = new ScaleMean();
        sScales[3]->init( z1, 8, 16, 20 );
        alpha[3] = 0.8;

cScales[4] = new ScaleMean();
        cScales[4]->init( z1, 0, 3, 6 );
        sScales[4] = new ScaleMean();
        sScales[4]->init( z1, 2, 4, 14 );
        alpha[4] = 1.2;

cScales[5] = new ScaleMean();
        cScales[5]->init( z1, 4, 1, 1 );
        sScales[5] = new ScaleMean();
        sScales[5]->init( z1, 2, 4, 12 );
        alpha[5] = 0.9;
}
```

FIG. 14D

```
//NONFRICATIVES
    else if ( whichFlavor == 1 ) {
        numberOfScales = 6;

cScales[0] = new ScaleMean();
        cScales[0]->init( z1, 4, 4, 1 );
        sScales[0] = new ScaleMean();
        sScales[0]->init( z1, 3, 2, 3 );
        alpha[0] = 1.0;

cScales[1] = new ScaleMean();
        cScales[1]->init( z1, 4, 4, 8 );
        sScales[1] = NULL;
        alpha[1] = 0.6;

cScales[2] = new ScaleMean();
        cScales[2]->init( z1, 0, 2, 1 );
        sScales[2] = new ScaleMean();
        sScales[2]->init( z1, 0, 3, 10 );
        alpha[2] = 1.1;

cScales[3] = new ScaleMean();
        cScales[3]->init( z1, 6, 6, 4 );
        sScales[3] = NULL;
        alpha[3] = 0.7;

cScales[4] = new ScaleMean();
        cScales[4]->init( z1, 1, 2, 2 );
        sScales[4] = NULL;
        alpha[4] = 0.6;

cScales[5] = new ScaleMean();
        cScales[5]->init( z1, 1, 4, 6 );
        sScales[5] = new ScaleMean();
        sScales[5]->init( z1, 10, 20, 8 );
        alpha[5] = 1.2;
    } allTimeCount = (float) 0.0;
    outSize = z1->getSize() * numberOfScales;

if ( buf0 == NULL )
    {
        // We need a min of 3 for finding energy in accumMeanAllTime.
        buf0 = new Zbuffer ( "buf0", z1->getType(), z1->getSize(), 3 );
```

FIG. 14E

```
                allTimeSum = new Zbuffer( "allTimeSum", z1->getType(), z1->getSize(), 1
);
                pZallTimeSum = allTimeSum->get( 0 );

}
        else
                allTimeSum->zero();

return TRUE;
}

/* Returns the mean for all time in this file.
*/
void NoveltyRT::accumMeanAllTime()
{
        // Get average of energy AROUND time 1.
        float energy = (float) 0.0;
        for (int i = 0; i < 3; i++)
                energy += (float) buf0->get(i)->get(0);
        energy = (float) (energy / 3.0);

/* Check fixed energy threshold. */
        if (energy > 22)
        {
                float *pfSum = (float*) pZallTimeSum->getData();
                allTimeCount++;
                for ( i = 0; i < (int) pZallTimeSum->getSize(); i++ )
                {
                        float newVal = (float) buf0->get(1)->get(i);
                        pfSum[i] += newVal;
                }
        } return;
} float NoveltyRT::getScaleMeanAllTime( int i )
{
        float scaleSum = (float ) pZallTimeSum->get( i );
        return (float) quo( scaleSum, allTimeCount );
}

Zipper* NoveltyRT::processZipper(Zipper* z1, Zipper* z2)
{
        Zipper* zout = Zipper::createZipper( ELIZA_FLOAT, outSize );
        zout->zero();
```

FIG. 14F

```
bSpeaking = FALSE;
if(z2) bSpeaking = int(z2->get(0));
// Store the input data in memory.
buf0->put( z1 );
if(bSpeaking) {

} else
        accumMeanAllTime();

// compute the multiscale NoveltyRT for each input point.
iout = 0;
theZout = zout;

for (int b = 0; b < numberOfScales; b++) {
        if ( cScales[b] != NULL )
                cScales[b]->update( z1 );
        if ( sScales[b] != NULL )
                sScales[b]->update( z1 );
        universal( z1->getSize(), cScales[b], sScales[b], alpha[b] );
        }
        return zout;
} void NoveltyRT::universal( int size, ScaleMean* center, ScaleMean* surround, double alpha )
{
        double scaleMean, scaleMean2, theNovelty;

if ( surround == NULL ) {
                for (int i = 0; i < size; i++ ) {
                        scaleMean  = center->get( i );
                        scaleMean2 = getScaleMeanAllTime( i );
                        theNovelty = scaleMean - alpha * scaleMean2;
                        put( theNovelty );
                }
        }
        else {
                for (int i = 0; i < size; i++ ) {
                        scaleMean  = center->get( i );
                        scaleMean2 = surround->get( i );
                        theNovelty = scaleMean - alpha * scaleMean2;
                        put( theNovelty );
                }
        }
}
```

FIG. 14G

Usage -

---> coincidenceRT --->   with   name0 | name1 | etc.

Function -

```
*/
#include "StdAfx.h"
#include <stdlib.h>
#include <stdio.h>
#include <string.h>
#include <assert.h>
include <math.h> include "speedObject.h"
include "eTrigger.h"

class CoincidenceRT : public SpeedProcess
{
public:
        CoincidenceRT();
        ~CoincidenceRT();

int begin ();
        int beginFile(Zipper* z1, Zipper* z2);
        int final();
        Zipper* processZipper (Zipper*, Zipper*);
        double get( int t, int f, int offset )
        {
                if ( t < 0 )
                        return 0.0;
                else
                        return pin[ t * inputStride + offset + f ];
        } public:
        int numberOfScales;
        int numberOfTimes;
        int gateStride;
        int columnSize;
        int localFreqSize;

private:
        int whichProcess;
        BOOL countMode;
        BOOL bSetSize;
```

FIG. 15A

```
int nTotal;
    int inputStride;
    int deltaWidth;
    int deltaStep;
    float *pin;
    char* pGate;
    float *pout;

float* getAddr( int t, int f, int offset ) {
            return pin + (t * inputStride + offset + f);
    } void put( double x ) {
            if ( countMode )
                    nTotal++;
            else
                    *pout++ = (float) x;
    }
    void doFricatives2();
    void doNonFricatives2();
    void doVowels2();
    void doGA();
    void doNonFricatives();
    void doVowels();
    void doFricatives();
    void dispatch();

void eCrossColumn( int delta, int tstart, int tstop, int fWidth, int whichScale);
    void eCrossColumn( eGateType eGate, int delta, int tstart, int tstop, int fWidth, int
whichScale );

void selfAddLocalFreq(    int tstart, int tstop, int localN, int whichScale );
    void selfAddLocalFreq( eGateType eGate, int tstart, int tstop, int localN, int
whichScale );

void crossAddLocalFreq( int delta, int tstart, int tstop, int fWidth, int whichScale );
    void crossAddLocalFreq( eGateType eGate, int delta, int tstart, int tstop, int
fWidth, int whichScale );
};

int CoincidenceRT::begin()
{
    deltaWidth = localFreqSize = 4;
    deltaStep = 1;
    numberOfScales = (int) parameters->AskUser("Number of scales from novelty",
 0.0, 10.0, 10.0 );
```

FIG. 15B

```
        numberOfTimes = (int) parameters->AskUser("Number of times in RF", 0.0,
100.0, 100.0 );
        gateStride = numberOfTimes * numberOfScales;
        localFreqSize = (int) parameters->AskUser("Local Frequency Size", 0.0, 100.0,
100.0 );
        whichProcess = parameters->askWords("GA nonfricatives vowels fricatives");
        bSetSize = TRUE;
        return TRUE;
}
void CoincidenceRT::dispatch()
{
        switch (whichProcess) {
                case 0:
                        doGA();
                        break;
                case 1:
                        doNonFricatives();
                        break;
                case 2:
                        doVowels();
                        break;
                case 3:
                        doFricatives();
                        break;
        }
} int CoincidenceRT::beginFile(Zipper* z1, Zipper* z2)
{
        // Simulate one run in countMode
        pin = (float *) z1->getData();
        pGate = (char *) z2->getData();
        if (bSetSize)
        {
                columnSize = z1->getSize() / ( numberOfScales * numberOfTimes );
                inputStride = numberOfScales * columnSize;

nTotal = 0;
                countMode = TRUE;
                dispatch();
                countMode = FALSE;
                int nf = columnSize-1;
                int nf1 = nf / localFreqSize;
                bSetSize = FALSE;
                cout << "CoincidenceRT: stride " << inputStride;
                cout << " columnSize " << columnSize;
```

FIG. 15C

```
            //cout << " nf1 is " << nf1 << " nTotal = " << nTotal;
            cout << endl;
        }
        return TRUE;
}

Zipper* CoincidenceRT::processZipper (Zipper* z1, Zipper* z2)
{
        pin = (float *) z1->getData();
        pGate = (char *) z2->getData();
        Zipper* zOut = Zipper::createZipper( ELIZA_FLOAT, nTotal );
        zOut->zero();
        pout = (float *) zOut->getData();

//dist->increment( ehi[1] - ehi[0]);
        dispatch();
        return zOut;
} void CoincidenceRT::doFricatives()
{
        //output size is 576
        eCrossColumn( ePlus,       -1,  1, 12,  7, 0 );
        eCrossColumn( eMinus,       1,  0, 14, 13, 2 );
        eCrossColumn( eDeltaMinus, -6,  6, 24,  6, 2 );
        eCrossColumn( eDeltaPlus,   1, 12, 23,  3, 2 );
        eCrossColumn( eDeltaMinus,  0,  3, 24,  2, 3 );
        eCrossColumn( eDeltaPlusM2,-5,  5, 24,  1, 3 );
        eCrossColumn( eMinus,      -5, 22, 24,  8, 4 );
        eCrossColumn( ePlus,        0,  8, 13,  1, 4 );
        eCrossColumn( eDeltaPlusP2,-7,  7, 24,  6, 5 );
        eCrossColumn( eDeltaPlus,   3,  0, 21, 16, 5 );
        eCrossColumn( ePlus,       -5,  8, 24, 16, 5 );
        selfAddLocalFreO( eDeltaMinus,  7, 24,  6, 5 );
        selfAddLocalFreq(                          14, 24, 10, 5 );
        selfAddLocalFreO( eMinus,       1, 24,  5, 5 );
        selfAddLocalFreO( eDeltaPlus,   1, 24,  8, 2 );
        selfAddLocalFreO( eDeltaMinus,  0, 22, 13, 1 );
        selfAddLocalFreO( eMinus,       0,  7,  6, 1 );
        selfAddLocalFreO( eDeltaMinus,  3, 24, 11, 0 );
        crossAddLocalFreO( eDeltaPlus,  2,  0, 22,  9, 1 );
        crossAddLocalFreO( eDeltaMinus, 3,  0, 21, 15, 1 );
        crossAddLocalFreO( eDeltaPlusP2,2,  0, 22,  6, 2 );
        crossAddLocalFreO(              1, 13, 23, 11, 2 );
        crossAddLocalFreO(             -3,  3, 24,  5, 3 );
        crossAddLocalFreO(             -1,  1, 24,  3, 3 );
```

FIG. 15D

```
        crossAddLocalFreO( ePlus,      -4,  4, 24, 12, 5 );
        crossAddLocalFreO( ePlus,       3,  0, 21, 11, 5 );
        crossAddLocalFreO( eMinus,     -2,  2, 24, 11, 5 );
} void CoincidenceRT::doNonFricatives()
{
        //output size is 697
        eCrossColumn( eDeltaPlus,   -7,  7, 16, 10, 0 );
        eCrossColumn( eMinus,        0,  0, 23, 10, 0 );
        eCrossColumn(               -2,  2, 24,  4, 0 );
        eCrossColumn( ePlus,        -7,  7, 17,  6, 1 );
        eCrossColumn( eDeltaPlus,   -1, 14, 24, 10, 1 );
        eCrossColumn( eDeltaPlus,    1,  0, 23,  2, 2 );
        eCrossColumn( eDeltaMinus,   0,  0, 24,  4, 2 );
        eCrossColumn( eDeltaPlus,   -1,  1, 24, 13, 2 );
        eCrossColumn( ePlus,         2,  0, 18, 10, 4 );
        eCrossColumn( eMinus,       -5, 10, 24,  5, 5 );
        selfAddLocalFreO( ePlus,         4, 18, 17, 0 );
        selfAddLocalFreO( eDeltaMinus,   0, 24,  5, 0 );
        selfAddLocalFreO( eDeltaPlusM2,  5, 23,  6, 1 );
        selfAddLocalFreq(                1, 24,  4, 2 );
        crossAddLocalFreO( eMinus,       3,  0, 21,  5, 0 );
        crossAddLocalFreq( ePlus,       -2,  2, 24, 12, 0 );
        crossAddLocalFreO(              -4,  4, 24,  6, 2 );
        crossAddLocalFreO(               1,  0, 23,  5, 2 );
        crossAddLocalFreO(              -2,  2, 24,  5, 3 );
        crossAddLocalFreO( eDeltaPlus,   1,  0, 23,  6, 4 );
        crossAddLocalFreO(              -4,  4, 24,  9, 4 );
        crossAddLocalFreO(              -7,  7, 24,  8, 4 );
        crossAddLocalFreO( eDeltaPlus,  -2,  2, 24,  3, 4 );
        crossAddLocalFreq( eDeltaPlusP2,-3,  3, 24, 10, 4 );
        crossAddLocalFreq(              -6,  6, 24, 13, 5 );
        crossAddLocalFreq( eDeltaPlus,   2,  9, 22, 13, 5 );
} void CoincidenceRT::doVowels()
{
        //output size is 696
        eCrossColumn( ePlus,         -7,  7, 22,  9, 1 );
        eCrossColumn( eDeltaPlusM2,  -2,  2, 24,  5, 1 );
        eCrossColumn( ePlus,          2,  0, 21,  3, 1 );
        eCrossColumn( eMinus,        -7, 17, 21,  4, 2 );
        eCrossColumn( eDeltaMinus,   -4,  4, 24, 13, 2 );
        eCrossColumn( eDeltaPlus,    -7,  7, 24,  6, 3 );
        eCrossColumn(                -7,  7, 12,  6, 3 );
```

FIG. 15E

```
    eCrossColumn( eMinus,       -6,  6, 24,  4, 3 );
    eCrossColumn( eDeltaMinus,  -2,  2, 24, 10, 4 );
    selfAddLocalFreO( eDeltaPlusP2, 5, 23, 16, 4 );
    selfAddLocalFreO( ePlus,        2, 24,  3, 5 );
    selfAddLocalFreO( eDeltaMinus,  6, 24, 16, 5 );
    selfAddLocalFreO( eDeltaMinus,  0, 21, 16, 0 );
    selfAddLocalFreq(               3, 24,  6, 1 );
    selfAddLocalFreO( ePlus,        0, 24,  9, 1 );
    crossAddLocalFreO(             -4,  4, 24,  5, 1 );
    crossAddLocalFreO( eDeltaPlus, -4,  4, 24,  7, 1 );
    crossAddLocalFreO( eDeltaPlus, -3,  3, 23,  5, 2 );
    crossAddLocalFreO( ePlus,       2,  0, 22,  7, 2 );
    crossAddLocalFreO( ePlus,      -2,  2, 24,  5, 3 );
    crossAddLocalFreO( eMinus,     -3,  3, 24, 13, 3 );
    crossAddLocalFreO( eDeltaPlusP2, 1, 0, 23,  8, 3 );
    crossAddLocalFreO( eMinus,      1,  0, 23,  5, 4 );
    crossAddLocalFreO( eDeltaPlus, -2,  2, 24,  6, 4 );
    crossAddLocalFreO( ePlus,      -2,  2, 24,  4, 5 );
    crossAddLocalFreO( eMinus,     -3,  3, 24,  9, 5 );
} void CoincidenceRT::doGA()
{
        //doVowels();
        //doFricatives();
//      doNonFricatives();
} void CoincidenceRT::eCrossColumn( int delta, int tstart, int tstop, int fWidth, int whichScale=0 )
{
        int scaleBase = whichScale * columnSize;
        // Energy by itself
        double sum = 0.0;
        for ( int t = tstart; t < tstop; t++ )
                sum += get( t, 0, scaleBase ) * get( t+delta, 0, scaleBase );
        put( sum );

for ( int f = 1; f <= columnSize-fWidth; f += fWidth )
        {
                sum = 0.0;
                for ( int t = tstart; t < tstop; t++ )
                {
                        float* p1 = getAddr( t, 0, scaleBase );
                        float* p2 = getAddr( t+delta, f, scaleBase );
                        for ( int i = 0; i < fWidth; i++ )
```

FIG. 15F

```
                sum += *p1 * *p2++;
            }
            put( sum );
        }
    }

// N = 1 + numberOfFreqs/fWidth
    void CoincidenceRT::eCrossColumn( eGateType eGate, int delta, int tstart, int tstop, int
    fWidth, int whichScale=0 )
    {
        int scaleBase = whichScale * columnSize;
        int outOffset = whichScale * numberOfTimes;
        char* eGateA = pGate + gateStride * eGate + outOffset;

// Energy by itself
        double sum = 0.0;
        int stop = min( numberOfTimes-1-delta, tstop );
        int start = max( 0-delta, tstart);
        for ( int t = start; t < stop; t++ ) {
            sum += get( t, 0, scaleBase ) * get( t+delta, 0, scaleBase );
        }
        put( sum );

for ( int f = 1; f <= columnSize-fWidth; f += fWidth )
        {
            sum = 0.0;
            for ( int t = start; t < stop; t++ )
            {
                if( eGateA[t] ) {
                    float* p2 = getAddr( t+delta, f, scaleBase );
                    for ( int i = 0; i < fWidth; i++ ) {
                        sum += *p2++;
                    }
                }
            }
            put( sum );
        }
    } void CoincidenceRT::selfAddLocalFreq( int tstart, int tstop, int localN, int whichScale )
        {
        int scaleBase = whichScale * columnSize;

// Do full self product, but amalgamate by localN
        for ( int f1 = 1; f1 < columnSize-localN; f1 += localN )
            {
```

FIG. 15G

```
            for ( int f2 = 1; f2 <= f1; f2 += localN )
                        {
                        double sum = 0.0;
                        for ( int t = tstart; t < tstop; t++ )
                                {
                                float* p1 = getAddr( t, f1, scaleBase );
                                float* p2 = getAddr( t, f2, scaleBase );
                                for ( int i = 0; i < localN; i++ )
                                        sum += *p1++ * *p2++;
                                }
                        put( quo( sum, tstop - tstart ) );
                        }
                }
        }

// N = ( numberOfFreqs / localN ) * ( numberOfFreqs / localN - 1 ) / 2
void CoincidenceRT::selfAddLocalFreq( eGateType eGate, int tstart, int tstop, int fWidth,
int whichScale )
        {
        int scaleBase = whichScale * columnSize;
        int outOffset = whichScale * numberOfTimes;
        char* eGateA = pGate + gateStride * eGate + outOffset;

// Do full self product, but amalgamate by fWidth
        for ( int f1 = 1; f1 < columnSize-fWidth; f1 += fWidth ) {
                for ( int f2 = 1; f2 <= f1; f2 += fWidth ) {
                        double sum = 0.0;
                        for ( int t = tstart; t < tstop; t++ ) {
                                if ( eGateA[ t ] ) {
                                        float* p1 = getAddr( t, f1, scaleBase );
                                        float* p2 = getAddr( t, f2, scaleBase );
                                        for     ( int i = 0; i < fWidth; i++ ) {
                                                sum += *p1++ * *p2++;
                                        }
                                }
                        }
                        put( sum );
                }
        }
}

// N = ( numberOfFreqs / fWidth ) **2
void CoincidenceRT::crossAddLocalFreq( int delta, int tstart, int tstop, int fWidth, int
whichScale )
        {
        int scaleBase = whichScale * columnSize;
```

FIG. 15H

```
// Do full cross product, but amalgamate by 2s
for ( int f1 = 1; f1 <= columnSize - fWidth; f1 += fWidth )
    {
    for ( int f2 = 1; f2 <= columnSize - fWidth; f2 += fWidth )
        {
        double sum = 0.0;
        for ( int t = tstart; t < tstop; t++ )
            {
            float* p1 = getAddr( t+delta, f1, scaleBase );
            float* p2 = getAddr( t, f2, scaleBase );
            for ( int i = 0; i < fWidth; i++ )
                sum += *p1++ * *p2++;
            }
        put( sum );
        }
    }
} void CoincidenceRT::crossAddLocalFreq( eGateType eGate, int delta, int tstart, int tstop,
int fWidth, int whichScale )
    {
    int scaleBase = whichScale * columnSize;
    int outOffset = whichScale * numberOfTimes;
    char* eGateA = pGate + gateStride * eGate + outOffset;

// Do full cross product, but amalgamate by 2s
    for ( int f1 = 1; f1 <= columnSize - fWidth; f1 += fWidth ) {
        for ( int f2 = 1; f2 <= columnSize - fWidth; f2 += fWidth ) {
            double sum = 0.0;
            for ( int t = tstart; t < tstop; t++ ) {
                if( !eGateA[t] ) continue;

float* p1 = getAddr( t+delta, f1, scaleBase );
                float* p2 = getAddr( t, f2, scaleBase );
                for ( int i = 0; i < fWidth; i++ )
                    sum += *p1++ * *p2++;
                }
            put( sum );
            }
        }
    }
```

SPEECH RECOGNITION SYSTEM AND METHOD FOR GENERATING PHONOTIC ESTIMATES

CROSS-REFERENCE TO RELATED APPLICATIONS

This application is related to the following U.S. patent applications, of common assignee, from which priority is claimed, and the contents of which are incorporated herein in their entirety by reference:

"A Novel Approach to Speech Recognition," U.S. Provisional Patent Application Ser. No. 60/192,090 filed on Mar. 24, 2000;

"Combined Syntactic And Semantic Search, Parsing, And Application Access," U.S. Provisional Patent Application Ser. No. 60/192,091 filed on Mar. 24, 2000;

"Remote Server Object Architecture For Speech Recognition," U.S. Provisional Patent Application Ser. No. 60/192,076 filed on Mar. 24, 2000; and, "Speech Recognition Application Technology Using Web, Scripting, And Semantic Objects," U.S. Provisional Patent Application Ser. No. 60/191,915 filed on Mar. 24, 2000.

This application is also related to the following copending U.S. patent applications, the contents of which are incorporated herein in their entirety by reference:

"Phonetic Data Processing System and Method," U.S. patent application Ser. No. 09/815,796.

"Remote Server Object Architecture For Speech Recognition," U.S. patent application Ser. No. 09/815,808.

"Web-Based Speech Recognition With Scripting and Semantic Objects," U.S. patent application Ser. No. 09/815,726.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to speech recognition, and more particularly, to systems for and methods of transforming an acoustical speech signal into a linguistic stream of phonetics, words and other speech components.

In general, speech recognition is a multi-layered process. Typically, a speech recognition system analyzes a raw acoustic waveform over time, and applies some complex algorithm to extract a stream of linguistic units (e.g., the phonetics, words, etc.). The term "stream" may also be referred to herein as a "sequence" or a "series," and the term "linguistic units" may also be referred to herein as "phonetic estimates." The term "acoustic waveform" may also be referred to herein as "acoustic signal," "audio signal," or "audio waveform." A speech recognition system may further apply various sources of linguistic constraints, so that the utterance may be finally interpreted within a practical context.

Of all of the processes and associated technologies used for speech recognition, the transformation of an acoustic signal to a linguistic stream has been the most difficult, and remains the technology gatekeeper for practical applications. The problem is essentially one of pattern recognition, and shares many of the challenges of handwriting recognition, OCR and other visual recognition technologies. The process that transforms an acoustic signal to a linguistic stream is referred to herein as the "core speech recognizer".

There have been three primary strategies for approaching the problem of realizing the core speech recognizer: (1) the statistical approach, (2) the feature approach and (3) the perceptual or bio-modeling approach. Each approach is summarized below.

(1) Statistical Recognition

The statistical recognition approach involves first reducing the incoming data stream to its essential, most basic components, then applying algorithms to examine thousands, or in some cases millions, of statistical hypotheses to find the most likely spoken word-string. The framework used area most commonly (and nearly universally) is known as Hidden Markov Modeling (hereinafter referred to as "HMM").

(2) Recognition by Linguistic Features

This approach is based on the idea that the study of linguistics has accumulated a vast body of knowledge about the acoustic features that correspond to the phonetics of human language. Once these features are characterized and estimated, a system can integrate them statistically to derive the best guess as to the underlying spoken utterance.

The feature approach has not been very successful. However, the Jupiter system at MIT has successfully combined the statistical method with a feature-based front end. While this class of recognition system remains in an experimental stage, it performs well in limited domains.

(3) Biomodeling Human Perception: Partial Approaches

Humans are the only example we have of a working, efficient speech recognizer. Thus, it makes sense to try to mimic how the human brain recognizes speech. This "bio-modeling" approach may be the most challenging, as there is no definitive scientific knowledge for how humans recognize speech.

One approach to bio-modeling has been to use what is known about the inner ear, and design preprocessors based on physiological analogs. The preprocessors may be used to modify the raw acoustic signal to form a modified signal. The preprocessors may then provide the modified signal into standard pattern recognizers. This approach has yielded some limited success, primarily with regard to noise immunity.

Artificial Neural Nets (hereinafter referred to as "ANNs") fit somewhat into this category as well. ANNs have become a significant field of research, and provide a class of pattern recognition algorithms that have been applied to a growing set of problems. ANNs emphasize the enormous connectivity that is found in the brain.

HMM: The Standard Prior Art Technology

The essence of the HMM idea is to assume that speech is ideally a sequence of particular and discrete states, but that the incoming raw acoustic data provides only a distorted and fuzzy representation of these pristine states. Hence the word "hidden" in "Hidden Markov Modeling." For example, we know that speech is a series of discrete words, but the representation of that speech within the acoustic signal may be corrupted by noise, or the words may not have been clearly spoken.

Speech comprises a collection of phrases, each phrase includes a series of words, and each word includes components called phonemes, which are the consonants and vowels. Thus, a hierarchy of states may be used to describe speech. At the lowest level, for the smallest linguistic unit chosen, the sub-states are the actual acoustic data. Thus, if an HMM system builds up the most likely representation of the speech from bottom to top, each sub-part or super-part helping to improve the probabilities of the others, the system should be able to just read off the word and phrase content at the top level.

The real incoming acoustic signal is continuous, however, and does not exist in discrete states. The first solution to this problem was to use a clustering algorithm to find some reasonable states that encompass the range of input signals, and assign a given datum to the nearest one. This was called VQ, or Vector Quantization. VQ worked, to a limited extent, but it turned out to be much better to assign only a probability that the given datum belonged to a state, and it might perhaps belong to some other state or states, with some probability. This algorithm goes by the name of Continuous Density HMM.

Continuous Density HMM is now the most widely used algorithm. There are many choices for how to implement this algorithm, and a particular implementation may utilize any number of preprocessors, and may be embedded into a complex system.

The HMM approach allows a large latitude for choosing states and hierarchies of states. There is a design trade-off between using phonetics or words as the base level. Words are less flexible, require more training data, and are context dependent, but they can be much more accurate. Phonetics allows either a large vocabulary or sets of small and dynamic vocabularies. There is also a trade-off between speaker-dependent (i.e., speaker-adaptive) systems, which are appropriate for dictation, and speaker-independent systems, which are required for telephone transactions. Since individuals speak differently, HMM needs to use a large number of states to reflect the variation in the way words are spoken across the user population. A disadvantage to prior art systems that use HMM is a fundamental trade-off between functionality for (1) many words or (2) many people.

Challenges to Automatic Speech Recognition (ASR)

A publicly accessible recognition system must maintain its accuracy for a high percentage of the user population.

"Human adaptation to different speakers, speaking styles, speaking rates, etc., is almost momentarily [i.e. instantaneous]. However, most so-called adaptive speech recognizers need sizable chunks of speech to adapt." (Pols, Louis C. W., *Flexible, robust, and efficient human speech recognition*, Institute of Phonetic Sciences, University of Amsterdam, Proceedings 21 (1997), 1–10)

Variation in users includes age, gender, accent, dialect, behavior, motivation, and conversational strategy.

A publicly accessible speech recognition system must also be robust with respect to variations in the acoustical environment. One definition of environmental robustness of speech recognition is maintaining a high level of recognition accuracy in difficult and dynamically-varying acoustical environments. For telephone transactions, variations in the acoustical environment may be caused by variations in the telephone itself, the transmission of the voice over the physical media, and the background acoustical environment of the user.

"Natural, hands-free interaction with computers is currently one of the great unfulfilled promises of automatic speech recognition (ASR), in part because ASR systems cannot reliably recognize speech under everyday, reverberant conditions that pose no problems for most human listeners." (Brian E. D. Kingsbury, *Perceptually-inspired signal processing strategies for robust speech recognition in reverberant environments*, PhD thesis, UC Berkeley, 1998.)

In many respects, adverse effects on the acoustic signal to be recognized are getting worse with new communications technology. Speaker-phone use is becoming more common, which increases the noise and the effect of room acoustics on the signal. The speech signal may be degraded by radio transmission on portable or cellular phones. Speech compression on wire-line and cellular networks, and increasingly, on IP-telephony (i.e., voice-over-IP), also degrades the signal. Other sources of background noise include noise in the car, office noise, other people talking, and TV and radio.

"One of the key challenges in ASR research is the sensitivity of ASR systems to real-world levels of acoustic interference in the speech input. Ideally, a machine recognition system's accuracy should degrade in the presence of acoustic interference in the same way a human listener's would: gradually, gracefully and predictably. This is not true in practice. Tests on different state-of-the-art ASR systems carried out over a broad range of different vocabularies and acoustic conditions show that automatic recognizers typically commit at least ten times more errors than human listeners." (Brian E. D. Kingsbury, *Perceptually-inspired signal processing strategies for robust speech recognition in reverberant environments*, PhD thesis, UC Berkeley, 1998.)

"While a lot of progress has been made during the last years in the field of Automatic Speech recognition (ASR), one of the main remaining problems is that of robustness.

Typically, state-of-the-art ASR systems work very efficiently in well-defined environments, e.g. for clean speech or known noise conditions. However, their performance degrades drastically under different conditions. Many approaches have been developed to circumvent this problem, ranging from noise cancellation to system adaptation techniques." (K. Weber. *Multiple time scale feature combination towards robust speech recognition*. Konvens, 5. Konferenz zur Verarbeitung naturlicher Sprache, (to appear), 2000. IDIAP{RR 00-22 7})

Changes Needed to Optimize ASR

The ability of an ASR to integrate information on many time scales may be important.

"Evidence from psychoacoustics and phonology suggests that humans use the syllable as a basic perceptual unit. Nonetheless, the explicit use of such long time-span units is comparatively unusual in automatic speech recognition systems for English." (S. L. Wu, B. E. D. Kingsbury, N. Morgan, and S. Greenberg, *Incorporating information from syllable-length time scales into automatic speech recognition*, ICASSP, pages 721–724, 1998.)

The ability to generalize to new conditions of distortion and noise would be of great importance:

"The recognition accuracy of current automatic speech recognition (ASR) systems deteriorates in the presence of signal distortions caused by the background noise and the transmission channel. Improvement in the recognition accuracy in such environments is usually obtained by re-training the systems or adaptation with data from the new testing environment." (S. Sharma, *Multi-Stream Approach To Robust Speech Recognition*, OGI Ph.D. Thesis, April 1999, Portland, USA.)

It may be important to integrate information from many different aspects or features of the acoustic signal:

"One of the biggest distinctions between machine recognition and human perception, is the flexible multi-feature approach taken by humans versus the fixed and limited feature approach by pattern recognition machines." (Pols, Louis C. W., *Flexible, robust, and efficient human speech recognition*, Institute of Phonetic Sciences, University of Amsterdam, Proceedings 21 (1997), 1–10.)

Or again:

"Human listeners generally do not rely on one or a few properties of a specific speech signal only, but use various features that can be partly absent ('trading relations'), a speech recognizer generally is not that flexible. Humans can also quickly adapt to new conditions, like a variable speaking rate, telephone quality speech, or somebody having a cold, using pipe speech, or having a heavy accent. This implies that our internal references apparently are not fixed, as they are in most recognizers, but are highly adaptive." (Pols, Louis C. W., *Flexible, robust, and efficient human speech recognition*, Institute of Phonetic Sciences, University of Amsterdam, Proceedings 21 (1997), 1–10.)

"However, if progress is to be made against the remaining difficult problems [of ASR], new approaches will most likely be necessary." (Herve Bourlard, Hynek Hermansky, Nelson Morgan, *Towards increasing speech recognition error rates*, Speech Communication 18, pp.205–231, 1996.)

It is an object of the present invention to substantially overcome the above-identified disadvantages and drawbacks of the prior art.

SUMMARY OF THE INVENTION

The present invention is based on the concept that speech is an acoustical signal encoded with information, and the human brain applies a set of rules to the encoded signal to decode the information. Once those rules are determined, an artificial system can utilize the rules to similarly decode the signal and extract the information.

The essential principle of speech, we believe, is that the human brain hears in a highly parallel, multi-faceted fashion, and performs complex transformations at many levels. The stability, generality, and environmental robustness of such front-end processing leads to the qualities and features that distinguish this approach from other approaches to ASR. The technology described and claimed herein is strongly driven by the neurophysiology of human perception. A mathematical model of neural functioning is constructed and arranged to map the way the higher brain processes speech. This approach goes beyond the preprocessing steps, and avoids the limitations of ANNs. Like the brain, this mathematical model is a highly parallel series of processes, each of which performs specific functions, and which, taken together, take speech apart and put it back together in an intricate structure that builds in error-correction, robustness and the ability to generalize to new conditions.

The advantages have proven to be robustness and generality. Just as biomodeling the speech preprocessing provides some robustness, biomodeling the entire recognizer provides significantly more robustness.

The approach used in the present invention to the core recognition problem sidesteps the fundamental assumptions of HMM based technologies. There are no assumptions of discrete states for the acoustic data. Thus, noise or less probable utterances cannot miscue one data state for another.

Furthermore, HMM uses a web of phonetic hypotheses that depend critically on context. The phonetic front end of the present invention produces definite phonetic signals. This provides a context independence that is critical to performing well in real-world applications where the acoustic context and linguistic context are extremely variable.

Note that the Jupiter system mentioned above, while avoiding some of the difficulties of the HMM approach with a feature-estimation front-end, shares the statistical back-end of the HMM approach. With both front and back ends depending strongly on context, complexity grows, and success in one domain becomes difficult to translate to others. A key difference in the present invention is that the phonetic recognizer provides a feed-forward, context-independent stream of phonetic estimates. This allows simplification of follow-on processing steps.

The foregoing and other objects are achieved by the invention which in one aspect comprises a speech recognition system for transforming an acoustic signal into a stream of phonetic estimates. The system includes a frequency analyzer for receiving the acoustic signal and producing as an output a short-time frequency representation of the acoustic signal. The system further includes a novelty processor that receives the short-time frequency representation of the acoustic signal, and separates one or more background components of the representation from one or more region of interest components of the representation. The novelty processor produces a novelty output that includes the region of interest components of the representation according to one or more novelty parameters. The system also includes an attention processor that receives the novelty output and produces a gating signal as a predetermined function of the novelty output according to one or more attention parameters. The system further includes a coincidence processor that receives the novelty output and the gating signal, and produces a coincidence output. The coincidence output includes information regarding co-occurrences between samples of the novelty output over time and frequency. The coincidence processor selectively gates the coincidence output as a predetermined function of the gating signal, so as to produce a gated coincidence output according to one or more coincidence parameters. The system also includes a vector pattern recognizer and a probability processor for receiving the gated coincidence output and producing a phonetic estimate stream representative of acoustic signal.

In another embodiment of the invention, the short-time frequency representation of the audio signal includes a series of consecutive time instances. Each consecutive pair is separated by a sampling interval, and each of the time instances further includes a series of discrete Fourier transform (DFT) points, such that the short-time frequency representation of the audio signal includes a series of DFT points.

In another embodiment of the invention, for each DFT point, the novelty processor calculates a first average value across a first predetermined frequency range and a first predetermined time span. The novelty processor also calculates a second average value across a second predetermined frequency range and a second predetermined time span. The novelty processor then subtracts the second average value from the first average value so as to produce the novelty output.

In another embodiment of the invention, the first frequency range, the first time span, the second frequency range and the second time span are each a function of one or more of the novelty parameters.

In another embodiment of the invention, the first predetermined frequency range is substantially centered about a frequency corresponding to DFT point, and the first predetermined time span is substantially centered about an instant in time corresponding to the DFT point.

In another embodiment of the invention, the first predetermined frequency range is substantially smaller than the second predetermined frequency range.

In another embodiment of the invention, the first predetermined time span is substantially smaller than the second predetermined time span.

In another embodiment of the invention, the second predetermined time span is large relative to the second predetermined frequency range.

In another embodiment of the invention, the second predetermined frequency range is large relative to the second predetermined time span.

In another embodiment of the invention, for each DFT point, the novelty processor further calculates one or more additional novelty outputs. Each additional novelty output is defined by characteristics including a distinct first frequency range, first time span, second frequency range and second time span, each characteristic being a function of one or more of the novelty parameters.

In another embodiment of the invention, the coincidence output includes a sum of products of novelty output points over two sets of novelty output points.

In another embodiment of the invention, the two sets of novelty output points includes a first set of novelty output points corresponding to a first instant in time and a second set of novelty output points corresponding to a second time instance.

In another embodiment of the invention, the two sets of novelty output points all correspond to a single time instance.

In another embodiment of the invention, the coincidence processor performs the sum of products of novelty output points over two sets of novelty output points according to one or more selectably variable coincidence parameters including (but not limited to) time duration, frequency extent, base time, base frequency, delta time, delta frequency, and combinations thereof.

In another embodiment of the invention, each of the time instances further includes an energy value in addition to the series of novelty output points.

In another embodiment of the invention, the attention processor compares the energy value to a predetermined threshold value according to a comparison criterion, so as to produce an energy threshold determination. The attention processor then produces the gating signal as a predetermined function of the threshold determination.

In another embodiment of the invention, the one or more attention parameters include the predetermined threshold value, the comparison criterion and the predetermined function of the threshold determination.

In another embodiment of the invention, the novelty parameters, the attention parameters and the coincidence parameters are selected via a genetic algorithm.

In another aspect, the invention comprises a speech recognition system for transforming a short-time frequency representation of an acoustic signal into a stream of coincidence vectors. The system includes a novelty processor that receives the short-time frequency representation of the audio signal, and separates one or more background components of the signal from one or more region of interest components of the signal. The novelty processor also produces a novelty output including the region of interest components of the signal according to one or more novelty parameters. The system also includes a coincidence processor that receives the novelty output and the gating signal, and produces a coincidence vectors that includes data describing correlations between samples of the novelty output over time and frequency.

Another embodiment of the invention further includes an attention processor for receiving the novelty output and producing a gating signal as a predetermined function of the novelty output according to one or more attention parameters. The coincidence output is selectively gated as a predetermined function of the gating signal, so as to produce a gated coincidence output according to one or more coincidence parameters.

In another aspect, the invention comprises a method of transforming an acoustic signal into a stream of phonetic estimates. The method includes receiving the acoustic signal and producing a short-time frequency representation of the acoustic signal. The method further includes separating one or more background components of the representation from one or more region of interest components of the representation, and producing a novelty output including the region of interest components of the representation according to one or more novelty parameters. The method also includes producing a gating signal as a predetermined function of the novelty output according to one or more attention parameters. The method further includes producing a coincidence output that includes correlations between samples of the novelty output over time and frequency. The coincidence output is selectively gated as a predetermined function of the gating signal, so as to produce a gated coincidence output according to one or more coincidence parameters. The method also includes producing a phonetic estimate stream representative of acoustic signal as a function of the gated coincidence output.

In another embodiment of the invention, the method further includes calculating a first average value across a first predetermined frequency range and a first predetermined time span. The method further includes calculating a second average value across a second predetermined frequency range and a second predetermined time span, and subtracting the second average value from the first average value so as to produce the novelty output.

In another embodiment of the invention, the method further includes calculating, for each of a plurality of DFT points from the a short-time frequency representation of the acoustic signal, one or more additional novelty outputs. Each additional novelty output is defined by characteristics including a distinct first frequency range, first time span, second frequency range and second time span, each characteristic being a function of one or more of the novelty parameters.

In another embodiment of the invention, the method further includes performing a sum of products of novelty outputs over two sets of novelty outputs according to one or more selectably variable coincidence parameters. The parameters include (but are not limited to) time duration, frequency extent, base time, base frequency, delta time, delta frequency, and combinations thereof.

In another embodiment of the invention, the method further includes comparing the energy value to a predetermined threshold value according to a comparison criterion, so as to produce an energy threshold determination, and (ii) producing the gating signal as a predetermined function of the threshold determination In another embodiment of the invention, the method further includes selecting the novelty parameters, the attention parameters and the coincidence parameters via a genetic algorithm.

BRIEF DESCRIPTION OF DRAWINGS

The foregoing and other objects of this invention, the various features thereof, as well as the invention itself, may be more filly understood from the following description, when read together with the accompanying drawings in which:

FIG. 4 shows the novelty parameters produced by the GA for fricatives;

FIG. 5 shows the coincidence processing parameters and modules produced by the GA for fricatives;

FIG. 6 shows the novelty parameters produced by the GA for vowels;

FIG. 7 shows the coincidence processing parameters and modules produced by the GA for vowels;

FIG. 8 shows the novelty parameters produced by the GA for non-fricatives;

FIG. 9 shows the coincidence processing parameters and modules produced by the GA for non-fricatives;

FIGS. 11A and 11B together show the high-level object-flow specification of the complete processing flow of the one preferred embodiment of the system;

FIG. 12 shows a list of explanations for the modules, functions and parameters referred to in the object flow of FIGS. 11A and 11B;

FIGS. 13A and 13B together show the ScaleMean software module used in the NoveltyRT software module from one preferred embodiment of the present invention;

FIGS. 14A, 14B, 14C, 14D, 14E, 14F and 14G together show the NoveltyRT software module from one preferred embodiment of the present invention; and, FIGS. 15A, 15B, 15C, 15D, 15E, 15F, 15G, 15H and 15I together show the coincidenceRT and eTrigger software modules from one preferred embodiment of the present invention.

DESCRIPTION OF THE PREFERRED EMBODIMENTS

Figure 1:
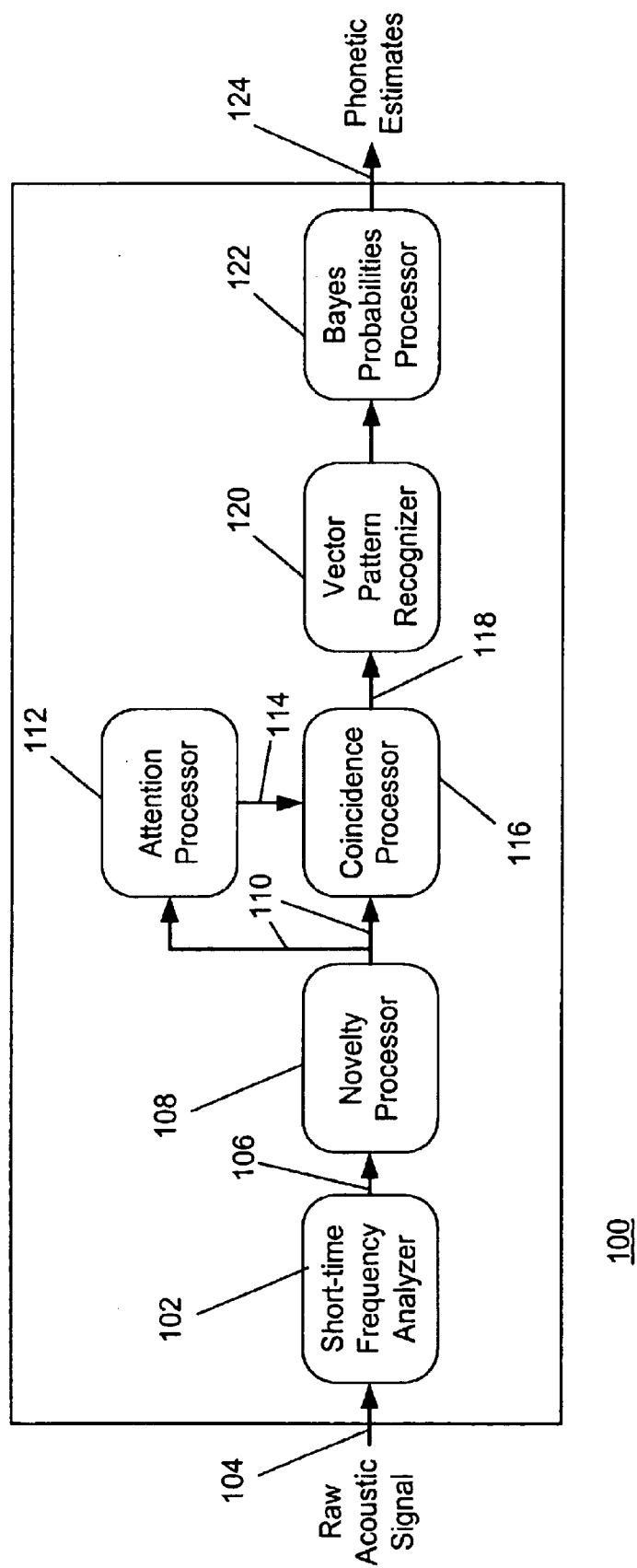
FIG. 1 provides an overview, in block diagram form, of the complete phonetic recognition system according to the present invention.

FIG. 1 provides an overview, in block diagram form, of the complete phonetic recognition system 100 according to the present invention. In the system 100, a short-time frequency analyzer 102 receives a raw acoustic signal 104 and produces a short-time representation 106 of the acoustic signal. A novelty processor 108 receives the short-time representation 106 of the acoustic signal and produces a novelty output 110. An attention processor 112 receives the novelty output 110 and produces an attention gate 114. A coincidence processor 116 receives the novelty output 110 and the attention gate 114 and produces a gated coincidence output 118. A vector pattern recognizer 120 and a Bayes probabilities processor 122 further process the gated coincidence output 118, so as to produce stream of phonetic estimates 124 corresponding to the acoustic signal 104.

The Short-time Frequency Analyzer 102, the Vector Pattern Recognizer 120 and the Bayes Probabilities processor 122 are described in detail in U.S. Pat. Nos. 5,027,408, 5,168,524, and 5,369,726, which are hereby incorporated by reference in their entirety. The description herein is primarily concerned with the novelty processor 108, the attention processor 112, and the coincidence processor 116, and how these components operate within the phonetic recognition system 100 as shown in FIG. 1

The phonetic recognition system 100 produces a context-independent, feed-forward phonetic stream corresponding to the acoustic signal 104. As used herein, the term "context independent" means that the data produced from any one component of the phonetic recognition system 100 can be interpreted correctly in any context, i.e., there is no need to ever go back and "re-work" the data. As used herein, the term "feed forward" means that the data flow within the phonetic recognition system 100 is in the forward direction only.

The context-independent phonetic stream simplifies and generalizes the functions of follow-on language search and understanding functions. This capability also provides structural and system advantages, such as the ability to separate and encapsulate modular high-level functions. In addition, these functions are separate from the system. This, in turn, provides the capability to use different implementations, technologies, hardware and system configurations, all within the same system architecture. The high-level functions remain independent of the implementation details associated with specific sub-functions and algorithms. This independence provides a fast and proven development environment, such as:

1. Re-use of common system components allows a maximum of tested, reliable software to be used.
2. Separable functions allows modular components to be completed and tested in isolation.
3. Maintenance and support are simplified.

The short-time frequency analyzer 102 processes the acoustic signal 104 to produce a short-time frequency representation. The details are essentially the same as is described in U.S. Pat. Nos. 5,027,408, 5,168,524, and 5,369,726. The time interval used is 12 msec, the input sampling rate is 8000 Hz and the length of the discrete Fourier transform (hereinafter "DFT") is 128. The 64 point DFT is averaged in bins to reduce its resolution to 40 points. Adding band-limited energy yields a stream of 41 point vectors every 12 msec. This frequency-time data stream is referred to herein in vector notation as x, or equivalently in functional notation as x(t, f). No other special effort is made to data-reduce the signal. Other frequency-time processing techniques (e.g., the Wigner-Ville transform) have been used in alternative embodiments, with no essential change in results. Other embodiments that perform at a higher resolution in time may be used, but at the expense of an increase in computation. The short-time frequency analyzer 102 of the present invention data-reduces less than is typical for prior-art HMM algorithms; thus the present invention preserves more information than such HMM systems.

The acoustic signal 104 is the sound produced by the speaker. The speech channel is the medium, or media, through which the sound passes before it reaches the ear of the listener. The speech signal is the result of, and the speech channel consists of, a cascade of time-varying linear or near-linear systems. The various mouthparts of the speaker can be manipulated differently, each shaping the varying exciting signal with frequency shaping effects such as resonances and anti-resonances. At any given point in time, these effects can all be approximately modeled by a cascade of linear systems, followed by a linear channel.

In the frequency domain, each of these linear systems is characterized by a Transfer Function, represented as a frequency spectrum. Because the speech systems are cascaded, one simply multiplies the source spectrum (glottal pulses or fricated noise) by all these spectra to infer the resulting spectrum. If one considers the log of the spectrum (i.e., power spectrum), then the various speech components may simply be added to infer the resulting spectrum. Next, the resultant log power spectrum may be decomposed into additive components, which will provide all there is to know about the speech signal. However, this is true only for a single point in time.

Each of the additive components is varying, the mouthparts are interacting in a coupled visco-elastic system, the speaker's head is moving, thus projecting the sound through a constantly changing channel, and the speaker's brain is listening and adapting and controlling all this in an unknown way. In the visual domain, the problem of perceiving a visual figure against a visual background is known as the figure-groundproblem. A similar problem exists in the speech domain. A particular phoneme results from a particular set of muscular actions by the speaker, so for speech recognition, the object is to perceive the resulting time-varying spectrum and infer which phoneme was spoken. The figure-ground problem is that the time-varying spectrum of interest is riding on an another unknown time-varying spectrum: one of similar or possibly larger amplitude. This background consists of all the phonemes and actions taking place around the time of the phoneme of interest, as well as the changing transmission channel.

Novelty . . . newness . . . surprise; these are words that colloquially describe new information. An information processor that maximizes novelty necessarily maximizes information. As described herein, solving the figure-ground problem in the speech domain requires separating a time varying signal of interest from a background time varying signal that has been added to it. Ideally, the confusing signal (e.g., effect resulting from the head motion of the speaker) is slower that phonetic signal of interest. In this case, one can simply subtract an average of an appropriate time-constant from the signal and so produce the phonetic signal of interest. But this is also an information-maximizing operation, in that the slow-moving signal is known, but the faster signal is relatively new. In general, the novelty processor 108 performs a differential operation, i.e., it compares two regions of the incoming short-time representation 106 of the acoustic signal. The result of the comparison is a novelty output value for each input signal sample.

Figure 2:
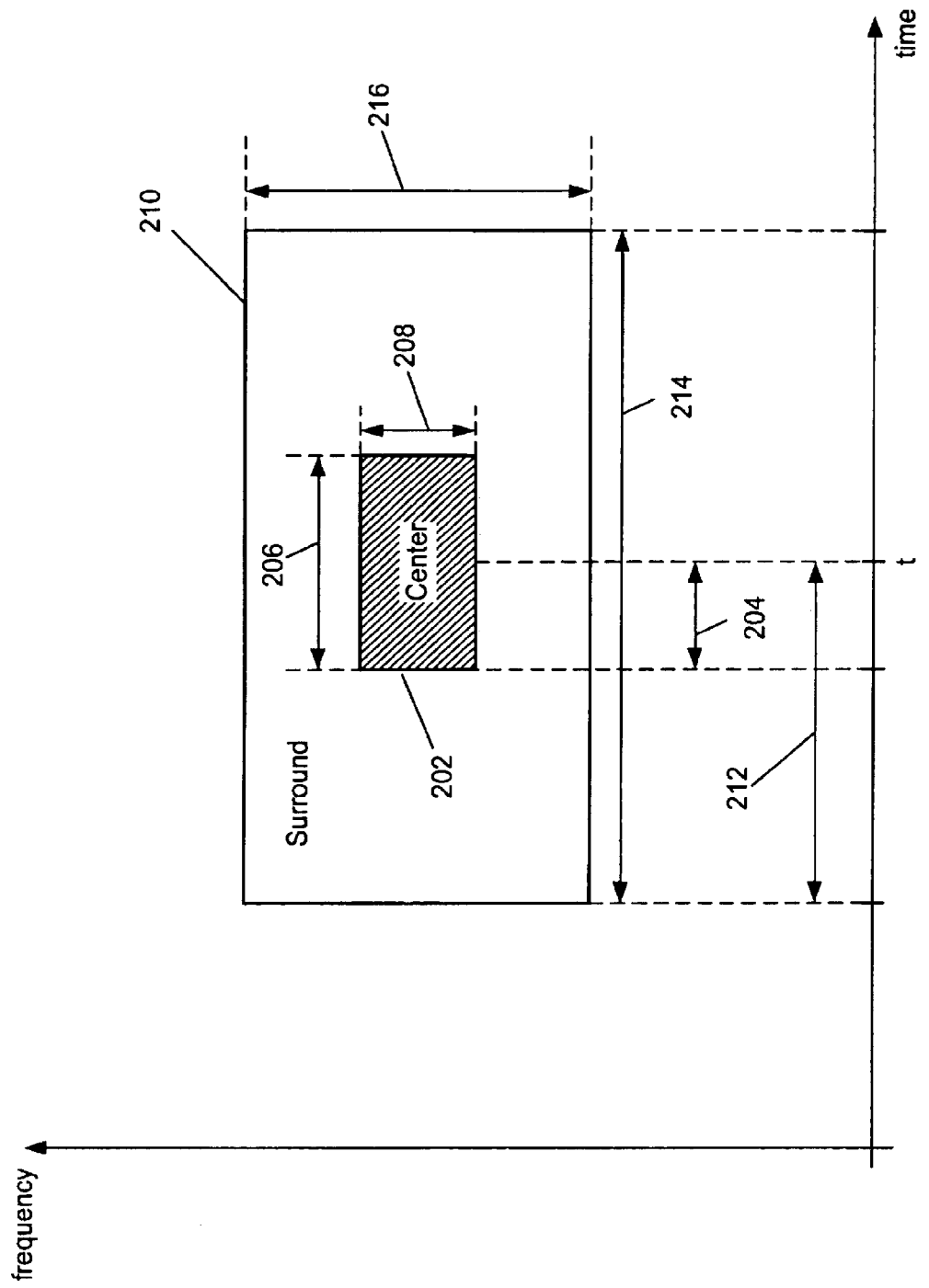
FIG. 2 shows the center-surround receptive field novelty processing performed by the novelty processor of the system shown in FIG. 1.

The basic operation of subtracting a local background component from the signal region of interest component of the signal at a given time is referred to herein as "novelty processing," and is performed by the novelty processor 108. The novelty processor 108 performs novelty processing for each frequency (i.e., for each DFT point), at each time, so that a "novelty-processed" version of the spectral stream is the resulting novelty output. Thus, the novelty processor 108 produces a "novelty point" for each input DFT point. Since there is initially no way to know what the optimum averaging interval should be, or even whether it should change over time or frequency, the novelty processor 108 processes many different averaging intervals in parallel, via a software module referred to herein as "noveltyRT." This novelty processing is similar to processing known to occur in the brain, in both the visual and auditory systems, known as the center-surround receptive field by physiologists. The noveltyRT module processes the frequency-time data stream x(t, f) as described in the following description, and as shown in FIG. 2. At each time t, and frequency f, 1. The novelty processor 108 calculates an average of the values of the data stream x(t, f) within a center rectangle 202 to produce the value $C_{AVG}$. The center rectangle 202 corresponds to the region of interest component described herein. The novelty parameters that may be varied are time-lag 204 relative to time t (where t is the center of the rectangle in the time dimension), length 206 and width 208 of rectangle 202.
2. The novelty processor 108 calculates an average of the values of the data stream x(t, f) within a surround rectangle 210 to produce the value $S_{AVG}$. The surround rectangle 210 corresponds to the background component described herein. The parameters used are time-lag 212 relative to time t (where t is the center of the rectangle in the time dimension), length 214 and width 216 of rectangle 210. Note that these parameters are independent of the Center.
3. The novelty output y(t, f) at time t and frequency f is the difference of Center and a scaled version of Surround, i.e., $y(t, f)=C_{AVG}-\alpha S_{AVG}$, where $\alpha$ is a scaling factor greater than or equal to zero.

Figure 3:
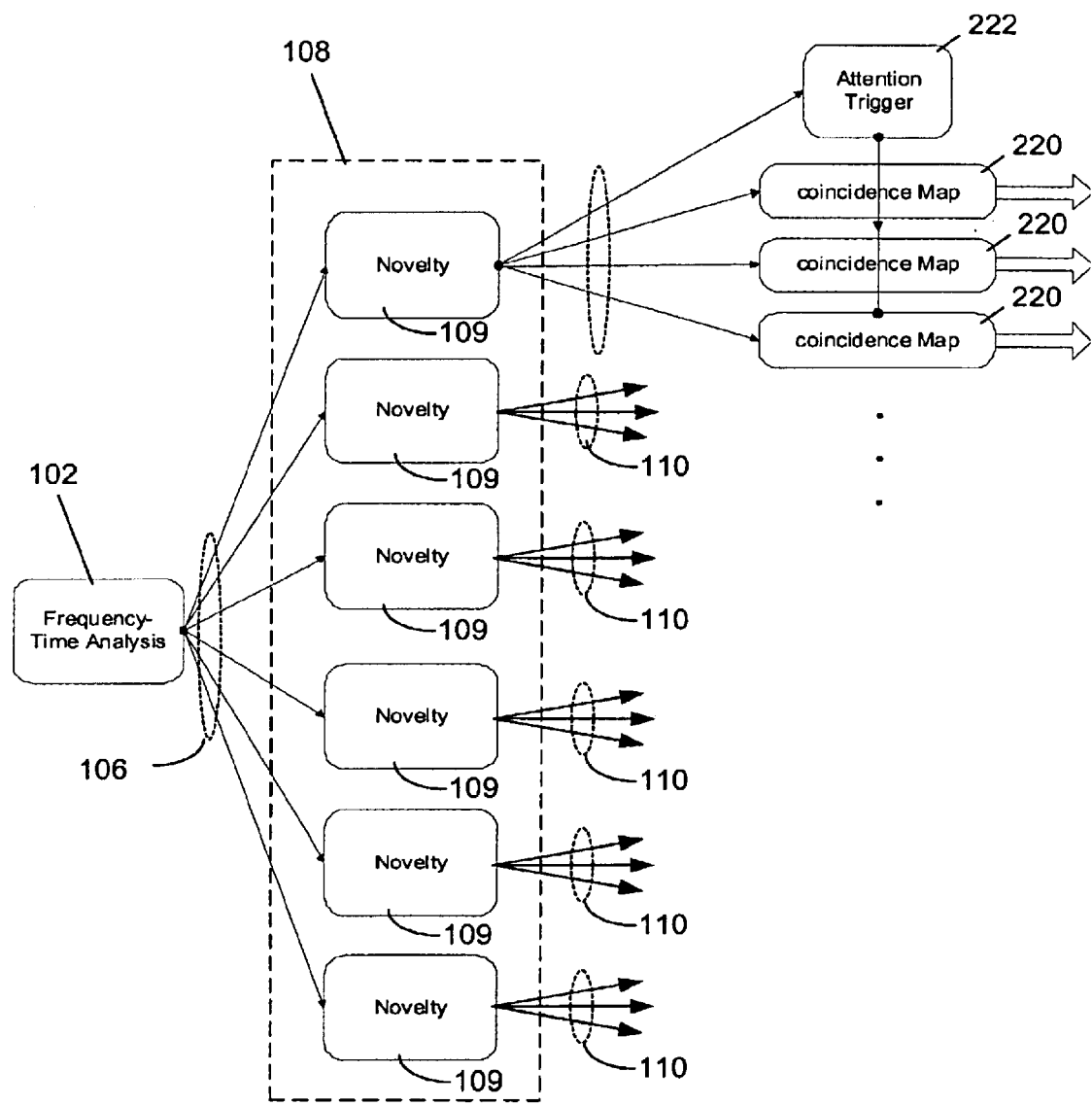
FIG. 3 shows the data flow from the short-time frequency analyzer through the novelty processor for one preferred embodiment of the invention shown in FIG. 1.

FIG. 3 shows the data flow from the short-time frequency analyzer 102 through the novelty processor 108 for one preferred embodiment of the invention. Note that the novelty processor 108 may produce multiple novelty outputs 110; one preferred embodiment produces six outputs 110. In FIG. 3, each set of novelty outputs 110 is shown being generated by a separate novelty instance 109 within the novelty processor. Each novelty instance 109 is characterized by a different set of novelty parameters. Each of the novelty outputs 110 is subsequently processed by several coincidence maps 220 (shown only for the first novelty instance 109). The coincidence maps 220 are processed within the coincidence processor 116, and are described in more detail herein. Further, several attention triggers 222 (also described herein) operate on each of the coincidence maps. In one preferred embodiment, there are 7 different attention triggers 222, and each coincidence map 220 may use one of these attention triggers 222.

In a preferred embodiment, the novelty processor 108 provides multiple novelty-processed versions of the original spectrum. Because each of these versions includes different and nonlinear follow-on processing, the multiple versions will result in very different and complementary views of the original signal. This redundancy contributes to robustness and generality of speech recognition. In some embodiments of the invention, the edges of the regions being compared may be weighted so that the edges tail off gradually, rather than the hard-edged regions described herein. In other embodiments, the regions being compared may have shapes other than rectangular as described herein. Some embodiments of the invention may utilize some other operation to produce the novelty output rather than the summing or averaging described herein. Such other operations may include variance of the regions, sum of the products of points in the regions, or other mathematical operations known to those in the art.

Assuming that a given novelty version contains the time-varying signal of interest, how does one identify it? The approach described herein for the present invention is motivated by two independent views.

1. Mathematical—use of a sum-of-products approach. This is a version of the Second order Volterra series approach discussed in the U.S. Pat. Nos. 5,027,408, 5,168,524, and 5,369,726 and has advantages of relatively easy evaluation, generality, and power.
2. Empirical/physiological—assume that there are relevant features, or sets of features that identify a particular signal. The product operation may be used as a logical conjunction (i.e., logical AND) to identify co-occurring pairs of data events, and also use summation (i.e., logical OR) to aggregate groups of co-occurring events, in order to collect large groups of data in a feasible manner.

This approach is referred to herein as "coincidence processing," because it is sensitive to the coincidence, or co-occurrence of events. The sums of products have the following 6 basic degrees of freedom, or coincidence parameters, that may be varied:

1. Time duration—defines the size of the time span over which the coincidence processor performs the sums of products.
2. Frequency extent—defines the frequency resolution that the coincidence processor uses for performing the sums of the products. Allows reduction in computations by reducing the overall number of frequency points used in the calculations.
3. Base time—defines the beginning of the time sweep range.
4. Base frequency—defines the beginning of the frequency range.
5. Delta time—defines the amount of time between points to be multiplied. This value remains constant as the time is swept when the coincidence processor performs the sums of the products.
6. Delta frequency—defines the frequency spacing between points to be multiplied.

The coincidence processor 116 groups like sets of these coincidence processing operations into specific groups, while varying some parameters and fixing the remaining parameters in an orderly, systematic way.

In one embodiment, coincidence processing is a sum of products over two sets of time-frequency input data. If y=y(t, f) is the novelty output stream 110, one output of the coincidence processor 116 is given by:

$$\text{Coincidence output} = \Sigma y_i \, y_j,$$

where i is the index for one predetermined set of novelty output samples, and j is the index for a second predetermined set of novelty input samples. The characteristics of each predetermined set of novelty input samples are defined by a corresponding set of coincidence parameters as described herein. The key to effective processing is in the selection and implementation of these sets, which have an enormous combinatorial potential. A distinct instance of coincidence processing (i.e., using a particular set of coincidence parameters) is referred to herein as a "coincidence map."

The particular software modules used in one preferred embodiment of the present invention are as follows:

1. eCrossColumn
2. selfAddLocalFreq
3. crossAddLocalFreq

The basic operation used by all these software modules is to sum products between two time-frequency rectangles. This operation is presented in pseudocode as follows:

```
SUMOVER2RECTANGLES(tstart, tstop, delta, f1, f2, fWidth)
    sum = 0.0;
    for (t = tstart; t < tstop; t++)
        for (i = 0; i < fWidth; i++)
            sum += y[t + delta, f1++] * y[t, f2++];
    put (sum);
```

Here, the first rectangle has origin (tstart, f1), time width tstop-tstart, and frequency height fWidth. The second rectangle has an origin of (tstart+delta, f2 ), a width of tstop-tstart, and a height of fwidth. The operation put( ) places the result on the next position of the output vector.

The software module eCrossColumn is presented in pseudocode as follows:

```
eCrossColumn(delta, tstart, tstop, fWidth)
    SUMOVER2RECTANGLES(tstart, tstop, delta, 0, 0, 1)
    for (f = 1; f ≤ frequencyMax - fWidth; f += fWidth)
        SUMOVER2RECTANGLES(tstart, tstop, delta, 0, f, fWidth)
```

Note that the band limited energy value is located at the zero position of the time/frequency input data (i.e., the novelty data 110) for each time t. The module eCrossColumn first calculates the limiting case of (energy * energy). Note also that the energy rectangle resulting from this calculation always has height 1. The remaining calculations include the sums of (energy * frequency sample) over consecutive frequency blocks, each fWidth wide, swept from tstart to tstop.

The software module selfAddLocalFreq is presented in pseudocode as follows:

```
selfAddLocalFreq(tstart, tstop, localN)
    for (f1 = 1; f1 < frequencyMax - localN; f1 += localN)
        for (f2 = 1; f2 ≤ f1; f2 += localN)
            SUMOVER2RECTANGLES(tstart, tstop, 0, f1, f2,
                localN)
```

The module selfAddLocalFreq computes the sum of products for each possible pair of blocks of frequency samples. The "self" notation indicates that the pairs occur at the same time (i.e., the "delta" argument in SUMOVER2RECTANGLES is set to zero). The size of the blocks is defined by the argument localN The software module crossAddLocalFreq is presented in pseudocode as follows:

```
crossAddLocalFreq(delta, tstart, tstop, fWidth)
    for (f1 = 1; f1 ≤ frequencyMax - fWidth; f1 += fWidth)
        for (f2 = 1; f2 ≤ frequencyMax - fWidth; f2 += fWidth)
            SUMOVER2RECTANGLES(tstart, tstop, delta, f1, f2,
                fWidth)
```

The module crossAddLocalFreq computes the sum of products for each possible pair of blocks of frequency samples. The "cross" notation indicates that the pairs occur at the different times (i.e., the "delta" argument in SUMOVER2RECTANGLES is set to some non-zero value).

Although the embodiment of the coincidence processor described herein sums the products of novelty points over particular regions, other embodiments may use other methods of comparing and/or combining novelty points. For example, one embodiment may use the logical "OR" of products of novelty points, while other embodiments may use the logical "AND" of pairs of novelty points. Another embodiment of the coincidence processor could simply produce a stream of novelty point combinations (e.g., products) that may be subsequently combined in different ways. Thus, the coincidence processor generally combines novelty points to detect coinciding or co-occurring events within the novelty output data stream.

The performance of the basic coincidence processing is enhanced when an appropriate "attention" gate 114 is used judiciously. The attention gate 114 forces the coincidence processor to process only those frequency samples that exist when salient events occur, such as times that coincide with an energy peak. An attention gate 114 may be expressed as a function of time a(t), which has value of "1" when a salient event occurs, and has a value of "0" otherwise. The coincidence processor may incorporate the attention gate 114 into the coincidence processing as follows:

Coincidence output=$\Sigma a(t) y_i y_j$,

Thus, the attention gate a(t) zeros out the product ($y_i y_j$) except at times where a(t)=1. Because no single attention gate is suitable for all types of coincidence processing, a preferred embodiment of the invention uses a variety of attention gates, and a particular coincidence function may used any of these, or none at all. For a given attention function, the pseudocode for the coincidence processing becomes:

```
SUMOVER2RECTANGLES-GATE(tstart, tstop, delta, f1, f2, fWidth,
eGate)
    sum = 0.0;
    for (t = tstart; t < tstop; t++)
        if (attention[t])
            for (i = 0; i < fWidth; i++)
                sum += x[t+delta,f1++] * x[t, f2++];
    put(sum);
eCrossColumn(attention, delta, tstart, tstop, fWidth)
    SUMOVER2RECTANGLES(tstart, tstop, delta, 0, 0, 1)
    for (f = 1; f ≤ frequencyMax − fWidth; f += fWidth)
        SUMOVER1RECTANGLES-GATE(tstart, tstop, delta, 0, f,
        fWidth)
selfAddLocalFreq(attention, tstart, tstop, localN)
    set putQuotient
    for (f1 = 1; f1 < frequencyMax − localN; f1 += localN)
        for (f2 = 1; f2 ≤ f1; f2 += localN)
            SUMOVER2RECTANGLES-GATE(tstart, tstop, 0, f1,
            f2, localN, attention)
crossAddLocalFreq(attention, delta, tstart, tstop, fWidth)
    for (f1 = 1; f1 ≤ frequencyMax − fWidth; f1 += fWidth)
        for (f2 = 1; f2 ≤ frequencyMax − fWidth; f2 += fWidth)
            SUMOVER2RECTANGLES-GATE(tstart, tstop, delta,
            f1, f2, fWidth, attention)
```

The main difference between these modules and the modules shown without the attention gate 114 is the gating of the sum in the sum of products function. There are also minor differences, in that the eCrossColumn module performs a simple sum of frequencies, since using the energy product with the energy gate 114 is somewhat redundant. Also, the selfAddLocalFreq module generates a sum that is normalized by the actual number of times used in the sum.

One preferred embodiment of the attention processor 112 generates seven different attention triggers as follows:

eplus
    if ( energy[t] > 0.0 )
        attention = 1;
eminus
    if ( energy[t] < 0.0 )
        attention = 1;
eDeltaPlus
    if ( ( energy[t]-energy[t−1] ) > 0.05 )
        attention = 1;
eDeltaPlusM1
    if ( ( energy[t−1] − energy[t−2] ) > 0.05 )
        attention = 1;
eDeltaPlusM2
    if ( ( energy[t−2] − energy[t−3] ) > 0.05 )
        attention = 1;
eDeltaPlusP2
    if ( ( energy[t+2] − energy[t+1] ) > 0.05 )
        attention = 1;
eDeltaMinus
    if ( ( energy[t]-energy[t−1] ) < −0.05 )
        attention = 1;

The attention parameters discussed herein are used to select which one, if any, of these attention triggers should be used to provide an attention gate 114 to the coincidence processor 116. Since any one of these triggers may be used, or none at all, there are eight attention gates possible.

The novelty, coincidence and attention parameters and particular software modules for the novelty-coincidence processing may be determined via manual trial and error. However, manual trial and error is a tedious and labor-intensive task. One preferred embodiment of the present invention applies the Genetic Algorithm (hereinafter referred to as "GA") to automatically determine an optimal set of parameters and modules. The GA is a very general method for optimization, well known to those in the art. It works by generating random variations and combinations from existing solutions, evaluating each variation in terms of some fitness function that is to be maximized, keeping the best solutions in a population, and applying recombination variation in a recursive procedure. The fitness function, for speech recognition, is some measure of accuracy of the entire algorithm, evaluated on a known and controlled set of speech.

In order to use the GA, the relevant parameters must be coded in a linear information array referred to herein as a "gene". In this case, we code the following general parameters:

1. Novelty parameters
2. Coincidence parameters and modules for each novelty output.
3. Attention parameters for each coincidence function.

One set of these general parameters that the GA generated is used in a preferred embodiment of the system 100, and are listed in FIGS. 4–9. The general parameters were optimized for each of the phonetic subgroups, vowels, fricatives, and nonfricative consonants. FIG. 4 shows the novelty parameters for fricatives. FIG. 4 shows six novelty outputs (channels). For each channel, FIG. 4 shows the center time-lag 204, the center length 206 and the center width 208, the scaling factor alpha, the surround time lag 212, the surround length 214 and the surround width 216. FIG. 5 shows the coincidence processing parameters and modules for fricatives. For each module, FIG. 5 shows the attention trigger 114, the time delta, the time start, the time stop, the frequency width (i.e., delta frequency) and the novelty channel upon which the module operates, all of which were generated by the GA. FIG. 6 shows the novelty parameters for vowels. FIG. 6 shows six novelty outputs (channels). For each channel, FIG. 6 shows the center time-lag 204, the center length 206 and the center width 208, the scaling factor alpha, the surround time lag 212, the surround length 214 and the surround width 216. FIG. 7 shows the coincidence processing parameters and modules for vowels. For each module, FIG. 7 shows the attention trigger 114, the time delta, the time start, the time stop, the frequency width (i.e., delta frequency) and the novelty channel upon which the module operates, all of which were generated by the GA. FIG. 8 shows the novelty parameters for non-fricatives. FIG. 8 shows six novelty outputs (channels). For each channel, FIG. 8 shows the center time-lag 204, the center length 206 and the center width 208, the scaling factor alpha, the surround time lag 212, the surround length 214 and the surround width 216. FIG. 9 shows the coincidence processing parameters and modules for non-fricatives. For each module, FIG. 9 shows the attention trigger 114, the time delta, the time start, the time stop, the frequency width (i.e., delta frequency) and the novelty channel upon which the module operates, all of which were generated by the GA.

Each of these three processors (the novelty processor 102, the attention processor 112 and the coincidence processor 116) produces a vector of data values. The final output is a concatenation of all three vectors generated by these three processes.

Figure 10:
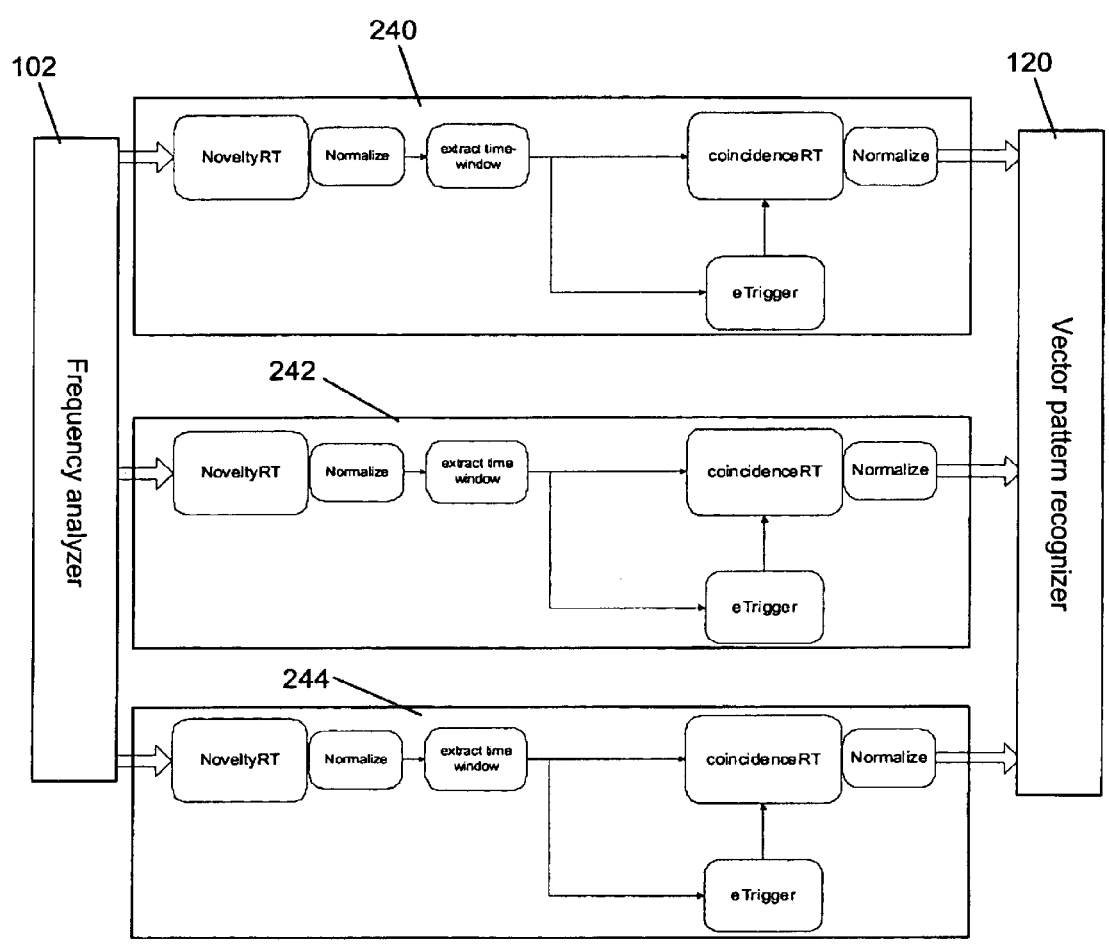
FIG. 10 shows the specific data flow used in a preferred embodiment of the invention shown in FIG. 1.

FIG. 10 shows the specific data flow used in a preferred embodiment of the invention shown in FIG. 1. FIG. 10 illustrates three similar processing units that run in parallel. A vowel processing unit 240 is optimized for detecting vowel phonics, a fricative processing unit 242 is optimized for fricatives, and a non-fricative processing unit 244 is optimized for non-fricative consonants. The outputs of the three processing units are collected (concatenated) into one large vector for the subsequent processing in the vector pattern recognizer 120. The used in the blocks of FIG. 10 correspond to the actual software module names in a preferred embodiment. FIG. 10 also denotes the details of data normalization and time-window formation.

The complete processing flow of the one preferred embodiment of the system 100 is specified by the high-level object-flow specification shown in FIGS. 11A and 11B. The terms used regarding the major steps in the object-flow specification are defined as follows:

Normalization—A pointwise mean and sigma normalization, based on fixed precomputed constant vectors, is done after the NoveltyRT and CoincidenceRT processes.

Extracting a Time-window—At every third input time (12 msec), a 24-time window is selected from the normalized novelty data stream. This provides an appropriate time-frequency domain for coincidenceRT Pattern Recognition—The outputs of the vowel, fricative, and nonfricative coincidence processes are all concatenated to form one large vector for each time. This vector is then applied to a vector classifier, or an array of phonetic detectors, as described in our previous patents.

Bayes Probabilities—In a manner similar to our previous patents, a non-parametric evaluation of the prior Bayes probabilities is performed offline. The log likelihood ratio curve is computed offline for each phoneme. At run-time, this curve is applied, at each time, and the log-likelihood estimates are sent on the search algorithm.

FIG. 12 shows a list of explanations for the modules, functions and parameters referred to in processing flow of FIGS. 11A and 11B.

FIGS. 13A and 13B, together show the ScaleMean software module used in the NoveltyRT software module from one preferred embodiment of the present invention.

FIGS. 14A, 14B, 14C, 14D, 14E, 14F and 14G together show the NoveltyRT software module from one preferred embodiment of the present invention.

FIGS. 15A, 15B, 15C, 15D, 15E, 15F, 15G, 15H and 15I together show the coincidenceRT and eTrigger software modules from one preferred embodiment of the present invention.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A speech recognition system for transforming an acoustic signal into a stream of phonetic estimates, comprising:

a frequency analyzer for receiving the acoustic signal and producing as an output a short-time frequency representation of the acoustic signal;

a novelty processor for receiving the short-time frequency representation of the acoustic signal, separating one or more background components of the representation from one or more region-of-interest components of the representation, and producing a novelty output including the region of interest components of the representation according to one or more novelty parameters;

an attention processor for receiving the novelty output and producing a gating signal as a predetermined function of the novelty output according to one or more attention parameters;

a coincidence processor for receiving the novelty output and the gating signal, and producing a coincidence output that includes co-occurrences between samples of the novelty output over time and frequency, wherein the coincidence output is selectively gated as a predetermined function of the gating signal, so as to produce a gated coincidence output according to one or more coincidence parameters; and a vector pattern recognizer and a probability processor for receiving the gated coincidence output and producing a phonetic estimate stream representative of acoustic signal;

wherein the short-time frequency representation of the audio signal includes a series of consecutive time instances, each consecutive pair separated by a sampling interval, and each of the time instances further includes a series of discrete Fourier transform (DFT) points, such that the short-time frequency representation of the audio signal includes a series of DFT points;

wherein for each DFT point, the novelty processor (i) calculates a first average value across a first predetermined frequency range and a first predetermined time span, (ii) calculates a second average value across a second predetermined frequency range and a second predetermined time span, and (iii) subtracts the second average value from the first average value so as to produce the novelty output point; and wherein the first frequency range, the first time span, the second frequency range and the second time span are each a function of one or more of the novelty parameters.

2. A speech recognition system for transforming an acoustic signal into a stream of phonetic estimates, comprising:
- a frequency analyzer for receiving the acoustic signal and producing as an output a short-time frequency representation of the acoustic signal;
- a novelty processor for receiving the short-time frequency representation of the acoustic signal, separating one or more background components of the representation from one or more region-of-interest components of the representation, and producing a novelty output including the region of interest components of the representation according to one or more novelty parameters;
- an attention processor for receiving the novelty output and producing a gating signal as a predetermined function of the novelty output according to one or more attention parameters;
- a coincidence processor for receiving the novelty output and the gating signal, and producing a coincidence output that includes co-occurrences between samples of the novelty output over time and frequency, wherein the coincidence output is selectively gated as a predetermined function of the gating signal, so as to produce a gated coincidence output according to one or more coincidence parameters; and
- a vector pattern recognizer and a probability processor for receiving the gated coincidence output and producing a phonetic estimate stream representative of acoustic signal;
- wherein the short-time frequency representation of the audio signal includes a series of consecutive time instances, each consecutive pair separated by a sampling interval, and each of the time instances further includes a series of discrete Fourier transform (DFT) points, such that the short-time frequency representation of the audio signal includes a series of DFT points;
- wherein for each DFT point, the novelty processor (i) calculates a first average value across a first predetermined frequency range and a first predetermined time span, (ii) calculates a second average value across a second predetermined frequency range and a second predetermined time span, and (iii) subtracts the second average value from the first average value so as to produce the novelty output point; and
- wherein the first predetermined frequency range is substantially centered about a frequency corresponding to DFT point, and the first predetermined time span is substantially centered about an instant in time corresponding to the DFT point.

3. A speech recognition system for transforming an acoustic signal into a stream of phonetic estimates, comprising:
- a frequency analyzer for receiving the acoustic signal and producing as an output a short-time frequency representation of the acoustic signal;
- a novelty processor for receiving the short-time frequency representation of the acoustic signal, separating one or more background components of the representation from one or more region-of-interest components of the representation, and producing a novelty output including the region of interest components of the representation according to one or more novelty parameters;
- an attention processor for receiving the novelty output and producing a gating signal as a predetermined function of the novelty output according to one or more attention parameters;
- a coincidence processor for receiving the novelty output and the gating signal, and producing a coincidence output that includes co-occurrences between samples of the novelty output over time and frequency, wherein the coincidence output is selectively gated as a predetermined function of the gating signal, so as to produce a gated coincidence output according to one or more coincidence parameters; and
- a vector pattern recognizer and a probability processor for receiving the gated coincidence output and producing a phonetic estimate stream representative of acoustic signal;
- wherein the short-time frequency representation of the audio signal includes a series of consecutive time instances, each consecutive pair separated by a sampling interval, and each of the time instances further includes a series of discrete Fourier transform (DFT) points, such that the short-time frequency representation of the audio signal includes a series of DFT points;
- wherein for each DFT point, the novelty processor (i) calculates a first average value across a first predetermined frequency range and a first predetermined time span, (ii) calculates a second average value across a second predetermined frequency range and a second predetermined time span, and (iii) subtracts the second average value from the first average value so as to produce the novelty output point; and
- wherein for each DFT point, the novelty processor further calculates one or more additional novelty outputs, and each additional novelty output is defined by characteristics including a distinct first frequency range, first time span, second frequency range and second time span, each characteristic being a function of one or more of the novelty parameters.

4. A speech recognition system for transforming an acoustic signal into a stream of phonetic estimates, comprising:
- a frequency analyzer for receiving the acoustic signal and producing as an output a short-time frequency representation of the acoustic signal;
- a novel processor for receiving the short-time frequency representation of the acoustic signal, separating one or more background components of the representation from one or more region-of-interest components of the representation, and producing a novelty output including the region of interest components of the representation according to one or more novelty parameters:
- an attention processor for receiving the novelty output and producing a gating signal as a predetermined function of the novelty output according to one or more attention parameters;
- a coincidence processor for receiving the novelty output and the gating signal, and producing a coincidence output that includes co-occurrences between samples of the novelty output over time and frequency, wherein the coincidence output is selectively gated as a predetermined function of the gating signal, so as to produce a gated coincidence output according to one or more coincidence parameters; and
- a vector pattern recognizer and a probability processor for receiving the gated coincidence output and producing a phonetic estimate stream representative of acoustic signal;
- wherein the novelty parameters, the attention parameters and the coincidence parameters are selected via a genetic algorithm.

5. A speech recognition system for transforming a short-time frequency representation of an acoustic signal into a stream of coincidence vectors, comprising:

a novelty processor for receiving the short-time frequency representation of the audio signal, separating one or more background components of the signal from one or more region of interest components of the signal, and producing a novelty output including the region of interest components of the signal according to one or more novelty parameters; and a coincidence processor for receiving the novelty output and the gating signal, and producing a coincidence vector that includes data describing co-occurrences between samples of the novelty output over time and frequency according to one or more coincidence parameters;

wherein the novelty parameters and the coincidence parameters are selected via a genetic algorithm.

6. A method of transforming an acoustic signal into a stream of phonetic estimates, comprising:

receiving the acoustic signal and producing a short-time frequency representation of the acoustic signal;

separating one or more background components of the representation from one or more region of interest components of the representation, and producing a novelty output including the region of interest components of the representation according to one or more novelty parameters;

producing a gating signal as a predetermined function of the novelty output according to one or more attention parameters;

producing a coincidence output that includes correlations between samples of the novelty output over time and frequency, wherein the coincidence output is selectively gated as a predetermined function of the gating signal, so as to produce a gated coincidence output according to one or more coincidence parameters;

producing a phonetic estimate stream representative of acoustic signal as a function of the gated coincidence output; and calculating, for each of a plurality of DFT points from the a short-time frequency representation of the acoustic signal, one or more additional novelty outputs, wherein each additional novelty output is defined by characteristics including a distinct first frequency range, first time span, second frequency range and second time span, each characteristic being a function of one or more of the novelty parameters.

7. A method according to claim 6, further including performing a sum of products of novelty outputs over two sets of novelty outputs according to one or more selectably variable coincidence parameters including time duration, frequency extent, base time, base frequency, delta time, delta frequency, and combinations thereof.

8. A method of transforming an acoustic signal into a stream of phonetic estimates, comprising:

receiving the acoustic signal and producing a short-time frequency representation of the acoustic signal;

separating one or more background components of the representation from one or more region of interest components of the representation, and producing a novelty output including the region of interest components of the representation according to one or more novelty parameters;

producing a gating signal as a predetermined function of the novelty output according to one or more attention parameters;

producing a coincidence output that includes correlations between samples of the novelty output over time and frequency, wherein the coincidence output is selectively gated as a predetermined function of the gating signal, so as to produce a gated coincidence output according to one or more coincidence parameters;

producing a phonetic estimate stream representative of acoustic signal as a function of the gated coincidence output; and selecting the novelty parameters, the attention parameters and the coincidence parameters via a genetic algorithm.

* * * * *

UNITED STATES PATENT AND TRADEMARK OFFICE
CERTIFICATE OF CORRECTION

PATENT NO. : 6,868,380 B2
DATED : March 15, 2005
INVENTOR(S) : John Kroeker

It is certified that error appears in the above-identified patent and that said Letters Patent is hereby corrected as shown below:

<u>Title page,</u>
Item [54], Title, after "GENERATING", delete "PHONOTIC", and insert thereof
-- PHONETIC --;

<u>Column 20,</u>
Line 38, after "a", delete "novel", and insert thereof -- novelty --.

Signed and Sealed this

Thirty-first Day of May, 2005

JON W. DUDAS
*Director of the United States Patent and Trademark Office*